(12) United States Patent
Bittlestone et al.

(10) Patent No.: US 12,050,495 B2
(45) Date of Patent: *Jul. 30, 2024

(54) METHODS AND APPARATUS TO CREATE A PHYSICALLY UNCLONABLE FUNCTION

(71) Applicant: TEXAS INSTRUMENTS INCORPORATED, Dallas, TX (US)

(72) Inventors: Clive Bittlestone, Allen, TX (US);
Joyce Kwong, Dallas, TX (US);
Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 246 days.

This patent is subject to a terminal disclaimer.

(21) Appl. No.: 17/130,076

(22) Filed: Dec. 22, 2020

(65) Prior Publication Data

US 2021/0109579 A1 Apr. 15, 2021

Related U.S. Application Data

(63) Continuation of application No. 14/816,940, filed on Aug. 3, 2015, now Pat. No. 10,877,531.

(51) Int. Cl.
G06F 1/26 (2006.01)
G06F 21/73 (2013.01)
H04L 9/32 (2006.01)

(52) U.S. Cl.
CPC ............... *G06F 1/26* (2013.01); *G06F 21/73* (2013.01); *H04L 9/3278* (2013.01)

(58) Field of Classification Search
None
See application file for complete search history.

(56) References Cited

U.S. PATENT DOCUMENTS

| 7,482,657 | B1 | 1/2009 | Lucero |
| 7,890,781 | B2 | 2/2011 | Gunther et al. |
| 8,850,608 | B2 | 9/2014 | Tehranipoor et al. |
| 9,015,500 | B2 * | 4/2015 | Guo .................. G09C 1/00 726/34 |
| 9,093,128 | B2 | 7/2015 | Otterstedt et al. |

(Continued)

OTHER PUBLICATIONS

Charlie Miller and Chris Valasek, "A Survey of Remote Automotive Attack Surfaces," http://illmatics.com/remote%20attack%20surfaces.pdf, Oct. 1, 2014, 95 pages.

(Continued)

*Primary Examiner* — Fahmida Rahman
(74) *Attorney, Agent, or Firm* — Michael T. Gabrik; Frank D. Cimino

(57) ABSTRACT

Methods and apparatus for creating a physically unclonable function for SRAM are disclosed. An example method includes decreasing a supply voltage of a memory array to a first voltage level, the first voltage level being below a normal operating voltage associated with the memory array, reading a first value of a bit cell after the supply voltage has been at the first voltage level, and determining a function based on the first value of the bit cell and a second value, the second value stored in the bit cell when the memory array is operating at a voltage level above the first voltage level, the function to represent an identification of a circuit including the memory array.

20 Claims, 15 Drawing Sheets

(56) References Cited

U.S. PATENT DOCUMENTS

| | | | | |
|---|---|---|---|---|
| 9,279,850 | B1* | 3/2016 | Pedersen | G01R 27/2605 |
| 9,298,946 | B2 | 3/2016 | Zhu et al. | |
| 9,436,845 | B2* | 9/2016 | Iyer | G11C 16/22 |
| 9,584,329 | B1* | 2/2017 | Trimberger | H04L 9/3278 |
| 2014/0201851 | A1 | 7/2014 | Guo et al. | |
| 2014/0268994 | A1 | 9/2014 | Rose et al. | |
| 2015/0058928 | A1* | 2/2015 | Guo | H04L 63/0876 |
| | | | | 726/30 |
| 2015/0092939 | A1 | 4/2015 | Gotze et al. | |
| 2015/0278505 | A1 | 10/2015 | Lu et al. | |

OTHER PUBLICATIONS

Techinsights, "Discovering new eFUSE technology in the Intel Westmere 32 nm CPU," https://www.techinsights.com/uploadedFiles/Public_Website/Content_-_Primary/Investigative_Analysis/2011/Five_Top_Trends_in_the_Mobile_Industry_for_2011/eFUSE%20technology%20in%20the%20Intel%20Westmere%20Clarkdale%20CPU.pdf, Nov. 15, 2010, 10 pages.

G. Edward Suh and Srinivas Devadas, "Physical Unclonable Functions for Device Authentication and Secret Key Generation," Jun. 4-8, 2007, 6 pages, DAC 2007, San Diego, California, USA.

Jorge Guajardo, Sandeep S. Kumar, Geert-Jan Schrijen, and Pim Tuyls, "FPGA Intrinsic PUFs and Their Use for IP Protection," Information and Systems Security Group, Phillips Research Laboratories, Eindhoven, The Netherlands, Sep. 2007, P. Paillier and I. Verbauwhede (Eds.): CHES 2007, LNCD 4727, pp. 63-80, Springer-Verlad Berlin Heidelberg, 2007. (24 pages).

Geert-Jan Schrijen and Vincent Van Der Leest, "Comparative analysis of SRAM memories used as PUF primitives," Mar. 2012, Intrinsic-ID, Eidenhoven, The Netherlands, http://www.intrinsic-id.com, 6 pages.

Microsemi, "SmartFusion2 SoC FPGA Security and Reliability User's Guide," Jan. 2015, Microsemi Corporate Headquarters, One Enterprise, Aliso Viejo, CA USA, 99 pages.

NXP, "PUF—Physical Unclonable Functions Protecting next-generation Smart Card ICs with SRAM-based PUFs," Feb. 2013, NXP Semiconductors N.V., Netherlands, 8 pages.

Mudit Bhargava and Ken Mai, "High Reliability PUF using Hot-Carrier Injection Based Response Reinforcement," Aug. 2013, Electrical and Computer Engineering—Carnegie Mellon University, 28 pages.

Roel Maes and Vincent Van Der Leest, "Countering the Effects of Silicon Aging on SRAM PUFs," May 2014, IEEE International Symposium on Hardware-Oriented Security and Trust (HOST), the Netherlands, 7 pages.

Christophe De Nardi, Romain Desplats, Philippe Perdu, Félix Beaudoin, and Jean Luc Gauffier, "EEPROM Failure Analysis Methodology: Can Programmed Charges Be Measured Directly by Electrical Techniques of Scanning Probe Microscopy?", Proceedings of the 31st International Symposium for Testing and Failure Analysis, Nov. 6-10, 2005, McEnery Convention Center, ASM International, San Jose, California, USA, 6 pages.

Aswin Raghav Krishna, Seetharam Narasimhan, Xinmu Wang, and Swarup Bhunia, "MECCA: A Robust Low-Overhead PUF Using Embedded Memory Array," Oct. 2011, Case Western Reserve University, Cleveland, Ohio, 44106, USA, ark70@case.edu, B. Preneel and T. Takagi (Eds.): CHES 2011, LNCS 6917, pp. 407-420, 2011, International Association for Cryptologic Research 2011, 18 pages.

* cited by examiner

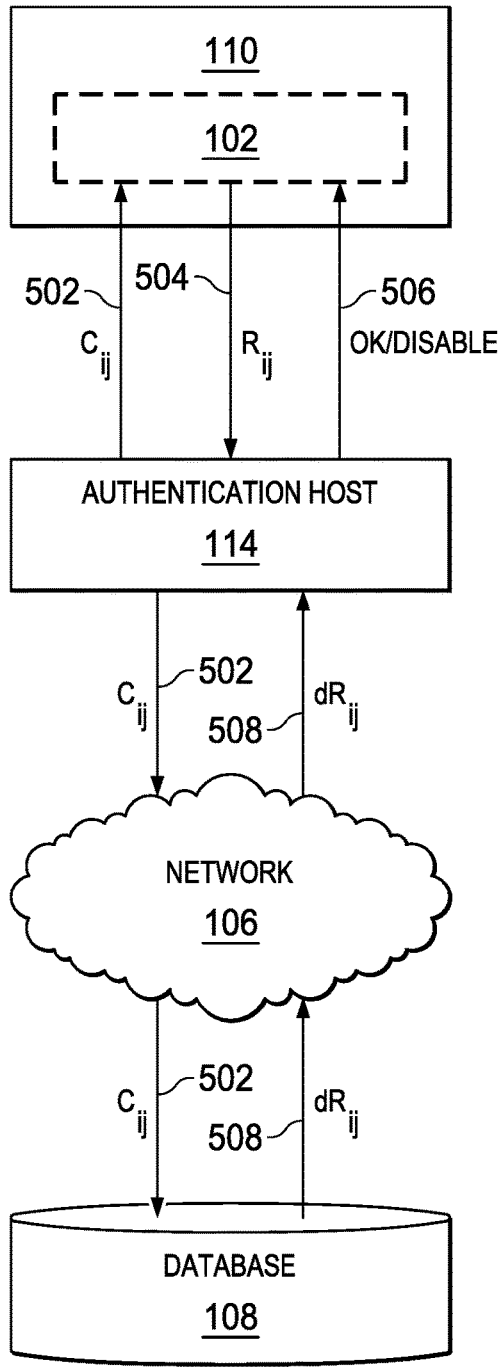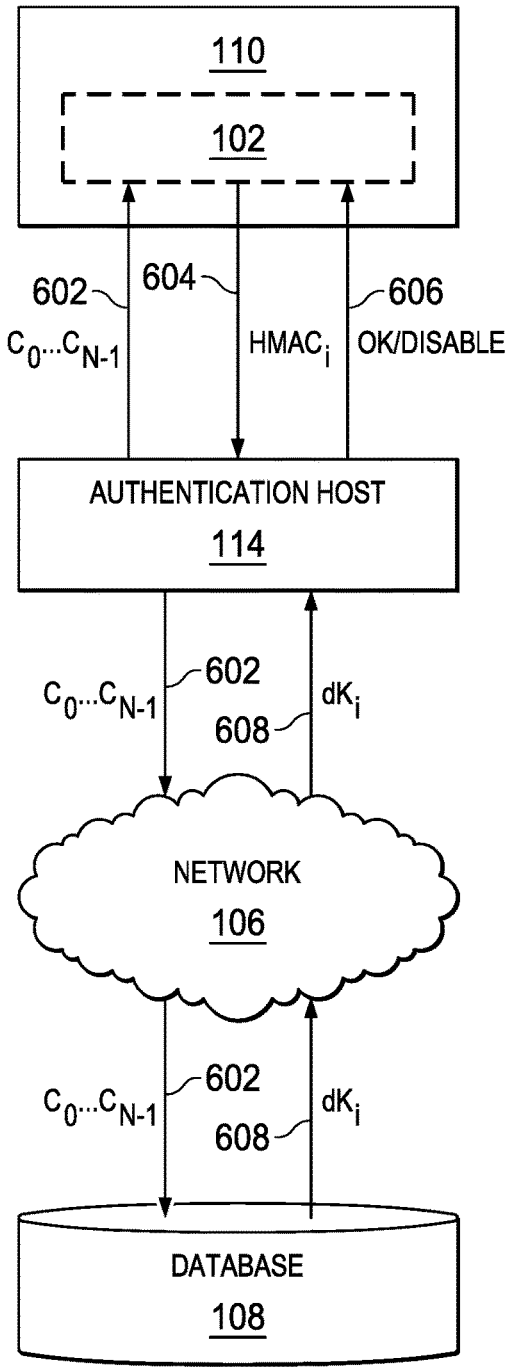

METHODS AND APPARATUS TO CREATE A PHYSICALLY UNCLONABLE FUNCTION

CROSS-REFERENCE TO RELATED APPLICATIONS

This disclosure is a continuation of U.S. patent application Ser. No. 14/816,940, filed Aug. 3, 2015, which is incorporated by reference herein in its entirety.

FIELD OF THE DISCLOSURE

This disclosure relates generally to memory devices and, more particularly, to methods and apparatus to create a Physically Unclonable Function (PUF).

BACKGROUND

A Physically Unclonable Function (PUF) is a function based on electrical and physical characteristics of an integrated circuit that may be used to uniquely identify the integrated circuit. A PUF is determined based on responses (e.g., outputs) of an integrated circuit to challenges (e.g., inputs) provided to the integrated circuit. Integrated circuits have unique responses to a challenge based on differences in the electrical and physical characteristics (e.g., variations in doping levels, resistances, capacitances, etc.) of the integrated circuits that result from the manufacturing processes of such circuits. These challenge-response pairs can be used to generate a PUF to uniquely identify a corresponding integrated circuit. Using a PUF as a unique identifier for an integrated circuit can be used to prevent attackers from easily cloning the circuit.

SUMMARY

Examples disclosed herein induce static random-access memory (SRAM) instability to create a PUF from the SRAM. An example method disclosed herein includes decreasing a supply voltage of a memory array to a first voltage level below a normal voltage associated with the memory array. In such examples, a bit cell determiner reads a first value of a bit cell after the supply voltage has been at the first voltage level. In such examples, a processor determines a function based on the first value of the bit cell and a second value stored in the bit cell when the memory array is operating at a voltage level above the first voltage level. In such examples, the function represents an identification of a circuit including the memory array.

BRIEF DESCRIPTION OF THE DRAWINGS

FIG. 5 is an example of authenticating an example SRAM based on a PUF.

FIG. 6 is an example of authenticating an example SRAM based on a keyed HMAC.

DETAILED DESCRIPTION

Figure 1:
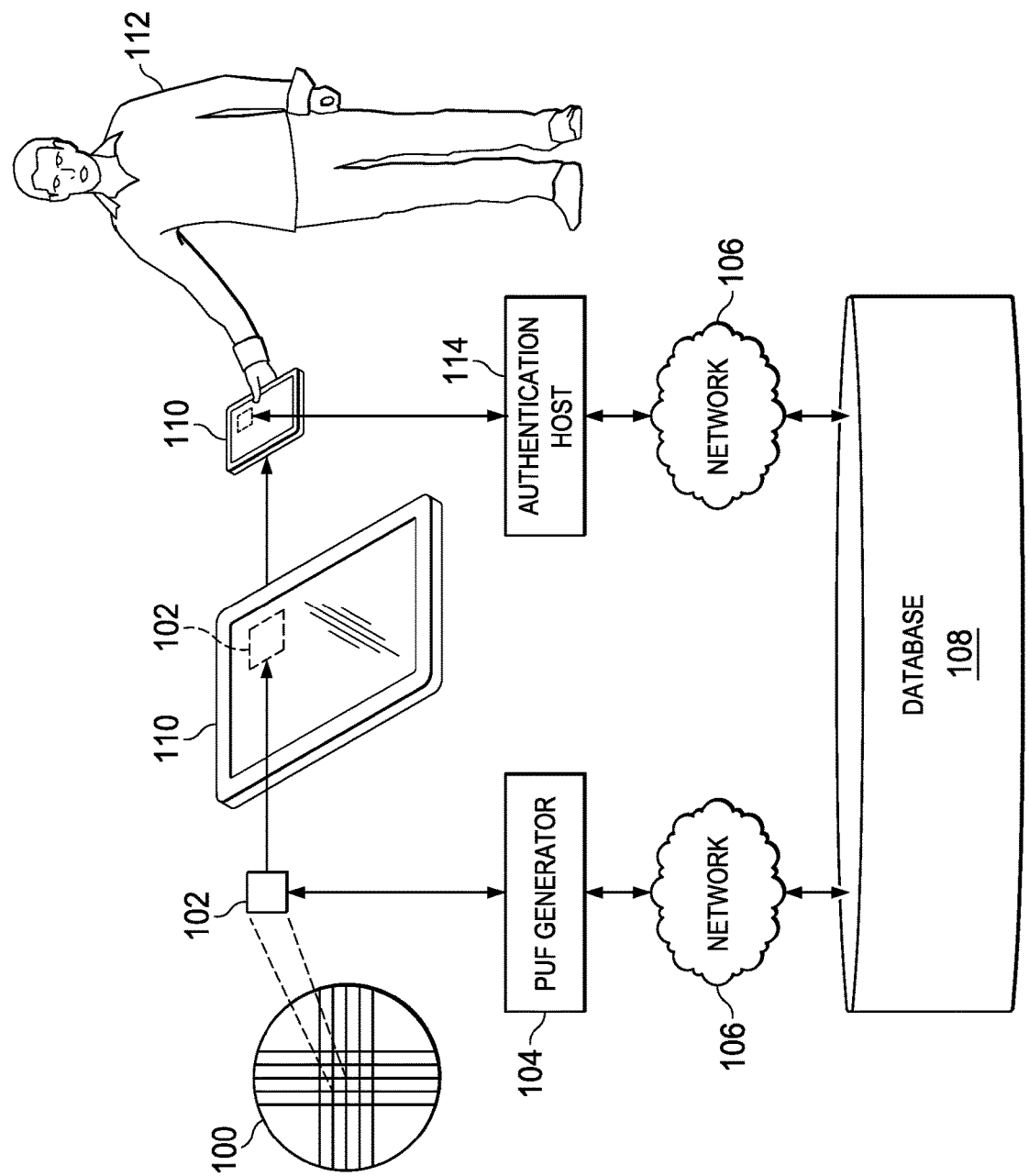
FIG. 1 is an example manner of incorporating an example SRAM in an example product for use in connection with the example PUF techniques disclosed herein.

A Physically Unclonable Function (PUF) is a function based on electrical and physical characteristics of an integrated circuit used to identify the integrated circuit. The PUF is made up of challenges (e.g., inputs) provided to the integrated circuit, and responses (e.g., outputs) to the challenges. There are many different types of PUFs. A PUF can be categorized as either weak or strong. A PUF is considered weak if it produces responses to a relatively small number of challenges. A PUF is considered strong if it produces responses to a relatively large number of challenges. Conventional Static Random Access Memory (SRAM) PUFs are categorized as weak PUFs. Such weakness is in part due to the limited number of challenges used to define the PUFs. In addition, the challenges used to create conventional SRAM PUFs are relatively unsophisticated which makes it easier for an attacker to replicate the PUFs, leaving SRAMs and their contents vulnerable to intruders. Examples disclosed herein generate a strong PUF using challenge types that are more robust than conventional techniques and, thus, are much more difficult for an attacker to replicate.

Examples disclosed herein may be used to generate PUFs for SRAM. An example SRAM has multiple bit cells that make up the memory storage capacity (e.g., 256 Kilobytes (Kb), 512 Kb, 1 megabyte (M), etc.). An example SRAM bit cell is formed using six transistors, such as metal oxide semiconductor (MOS) transistors. Since the MOS transistors vary slightly (e.g., each transistor has different electrical and physical characteristics) inducing instability (e.g., operating at voltages outside a normal operating voltage of the bit cell) in one bit cell will be different from another bit cell. As described herein, a comparison of the read failures of an SRAM array of multiple bit cells at a supply voltage outside the normal operating voltage may be used to create a PUF.

SRAM needs to be powered to hold the data stored in the bit cells. If SRAM loses power, the data within the bit cells of the SRAM will be lost. When SRAM is powered up, bit cells of the SRAM will stabilize to a particular logic value due to differences in physical and/or electrical characteristics of the bit cells. The differences between such physical and/or electrical characteristics are random across different bit cells and SRAM devices due to variations in materials, timing, and/or other process parameters during an integrated circuit fabrication process. Due to such randomness, the startup logic states of the bit cells of SRAM are used to create a conventional PUF. Since conventional PUF generation techniques use only one challenge to determine an SRAM PUF (e.g., initialize the supply voltage), which produces one response (e.g., the startup logic states of all bit cells), conventional SRAM PUFs are considered weak PUFs. Other conventional techniques for determining PUFs (e.g., Arbiter PUF, ring oscillator PUF, etc.) that use more challenges require additional hardware, which is more complex and expensive to add to an integrated circuit.

Example methods, apparatus, and articles of manufacture disclosed herein may be used to create a strong SRAM PUF with more robust challenge types than a conventional, weak SRAM PUF. Since a conventional SRAM PUF is determined based on startup logic states of individual bit cells in an SRAM, there is only one challenge (e.g., initialize the voltage supply) to determine the responses of the SRAM circuit. Furthermore, attacking techniques, such as delayering and probing an integrated circuit (IC), have been successful to determine a conventional PUF, to clone the IC. However, examples disclosed herein use the bit cell read failure of individual bit cells to increase the number and quality of challenges used to generate a PUF. In this manner, examples disclosed herein may be used to substantially decrease or prevent instances of delayering and probing by unauthorized parties (e.g., parties attempting to determine the proposed PUF).

To increase the number and quality of possible challenges for an SRAM PUF, methods disclosed herein have taken advantage of read failures of bit cells of an SRAM circuit when a supply voltage of the SRAM circuit is outside the normal operating voltage of the SRAM. For example, a logic value of '1' may be stored in a bit cell. Once the supply voltage is lowered to a level outside the normal operating voltage, the bit cell will either maintain or lose the logic value stored in the bit cell. If the logic value is maintained, a sense amplifier will return the intended logic value (e.g., '1') when the bit cell is read, and if the logic value is lost the sense amplifier will return an unintended value (e.g., '0') when the bit cell is read. A failure is determined based on a loss of a stored value or reading a value that does not match the stored value. Failures are associated with an independent variable like supply voltage and are consistent with respect to the independent variables. A PUF can be determined in response to a read failure pattern based on the responses of the bit cells in the SRAM. This method will produce N (where N is the number of bit cells) number of responses for the challenge creating a unique read failure pattern. Due to the complex interactions between circuits in the SRAM, the read failure pattern of a bit cell is dependent on the stored value of the bit cell, as well as the stored values of other bit cells conventional to the decrease of the supply voltage. Thus, multiple challenges can be produced (e.g., creating multiple stored logic patterns conventional to reducing the supply voltage) to create unique responses (e.g., read failure patterns). Multiple challenges with unique responses create a strong PUF.

Additionally, examples disclosed herein use more sophisticated challenges than conventional techniques by using bit cell read failure rates. Conventional SRAM PUFs are determined based on startup values of bit cells, such conventional SRAM PUFs have been vulnerable to intruders that have successfully used Near Infrared (NIR) photonic emissions to determine startup bit cell values in SRAM circuits, thus determining the corresponding PUFs. However, the example methods create PUFs with many challenges with unique responses. Therefore, it would be extremely difficult and expensive to completely determine all the unique responses of an instability induced PUF. Other methods of attacking SRAM PUFs include delayering and probing a chip to read out the stored code based on startup values of the bit cells. It is similarly difficult to completely determine an instability induced PUF by delayering and probing the chip due to the number of unique responses produced in the example methods.

A recursive method to create a PUF may be used, wherein the response to a particular challenge determines an input for a second challenge. For example, a challenge may be applied to an SRAM array and the responses will determine the parameters for a second challenge. The parameters may be the manner in which the supply voltage is altered, the initial values of the bit cells, etc. The recursive method significantly increases the number and quality of challenges to create a strong PUF, which is difficult for an attacker to replicate.

An example method disclosed herein includes decreasing a supply voltage of a memory array to a first voltage level below a normal voltage associated with the memory array. In such examples, a bit cell determiner reads a first value of a bit cell after the supply voltage has been at the first voltage level. In such examples, a processor determines a function based on the first value of the bit cell and a second value stored in the bit cell when the memory array is operating at a voltage level above the first voltage level. In such examples, the function represents an identification of a circuit including the memory array.

FIG. 1 is an illustration of the process of fabrication and authentication of an example SRAM chip in an example product. The illustration of FIG. 1 includes an example wafer 100, an example SRAM chip 102, an example PUF generator 104, and example network 106, and example database 108, an example product 110, an example user 112, and an example authentication host 114.

The example wafer 100 may be made from any semi-conductive material (e.g., high purity silicon). Chemical impurities (e.g., dopants) are introduced to the wafer 100 to create the electrical and/or physical characteristics associated with an SRAM chip 102. For example, the wafer 100 may be doped to create transistors that make up memory bit cells of the SRAM chip 102.

Example SRAM chip 102 is assembled from the example wafer 100. The SRAM chip 102 includes an SRAM array and a memory controller, as further described in FIG. 2. The SRAM array includes bit cells that store binary logic values (e.g., logic value '1' or logic value '0'). The memory controller writes logic values into the bit cells, reads the logic values from the bit cells, tracks bit cell failures, controls signals to the bit cells, receives challenges, and transmits responses as further described in FIG. 7. Due to the variation during the fabrication process, each SRAM chip will contain unique electrical and technical characteristics. Examples disclosed herein, use these unique characteristics of the SRAM chip 102 to create a PUF used to identify the SRAM chip 102.

During the PUF generation process, an example PUF generator 104 may be used to initiate challenges to the SRAM chip 102. The example PUF generator 104 provides instructions to a memory controller of the SRAM chip 102. The instructions include challenges to apply to the SRAM array to develop PUF data for later use (e.g., authentication, encryption, etc.). There are many variations of PUF parameters used to create challenges that are described herein to create PUF data. Thus, there are many challenges that can be applied. The PUF generator 104 may apply all possible challenges to the SRAM chip 102 at fabrication. Alternatively, to conserve memory, the PUF generator 104 may only apply a limited amount of challenges and may apply more challenges at a later time, as needed. The PUF generator 104 may apply the challenges directly to the SRAM chip 102 through a wired connection, or may alternatively apply challenges via a wireless connection or network.

An example network 106 communicates instructions, challenges, responses, and other data to various devices in the system of FIG. 1. The example network 106 may be a local area network, a wide area network (e.g., Internet, cloud, etc.), or any other type of communications network. The network 106 allows communications between an example database 108 and the example PUF generator 104.

An example database 108 stores PUF data associated with the example SRAM chip 102. The example database 108 contains and organizes PUF data from various SRAM chips and/or products. The example database 108 may be an external database facility, a local database, a cloud, and/or any other device capable of storing data. Additionally, the example database 108 may track which challenges were applied to the SRAM chip 102 during the fabrication process. In this manner, the database 108 is aware of additional challenges that may be applied to the SRAM chip 102 for additional PUF data. Additionally, the example database 108 may track which challenges were applied to the SRAM chip 102 during the authentication process. In this manner, the database 108 may communicate with the SRAM chip 102 to apply additional challenges to create more PUF data so that the authentication host 114 will not repeat a challenge.

Figure 2:
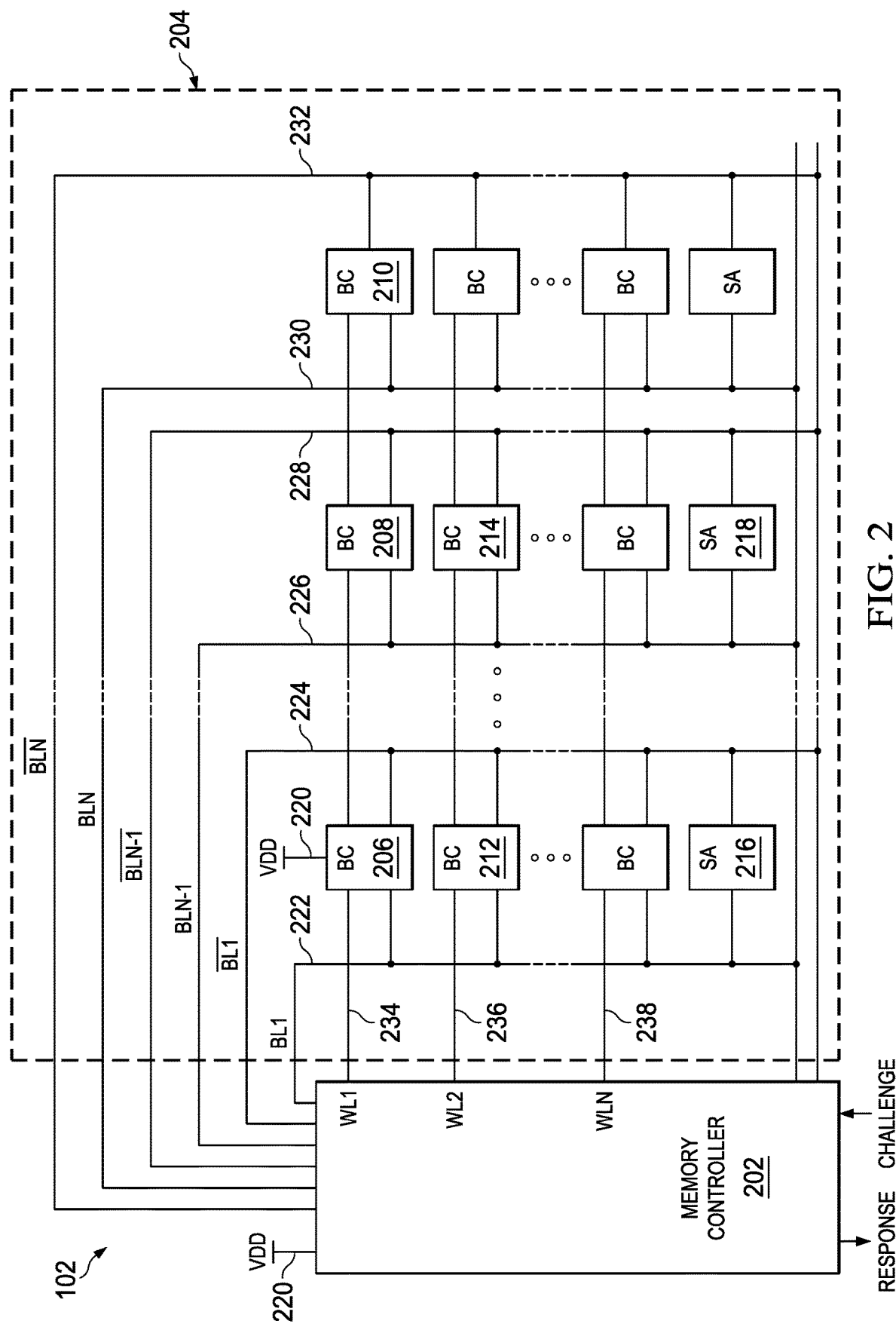
FIG. 2 is a portion of an example static random access memory (SRAM) chip including an example memory controller to create a PUF.

Once the example SRAM chip 102 is fabricated, it may be placed on an example product 110 to be used by user 112. In FIG. 2, the example product 110 is a smart card. Alternatively, the example product 110 may be a key card with security permissions, a key generator, a mobile phone, a computing device, or any other product that contains the SRAM chip 102. Generally, the PUF associated with the SRAM chip 102 acts as a fingerprint (e.g., a unique identifier) to uniquely identify the example product 110 regardless of the data stored in the SRAM chip 102. Using the PUF to authenticate the example product 110 allows for more secure use of products with sensitive data. In addition, the PUF responses may be used to create encryption keys for securing data on or communicated to/from the example product 110.

During an authentication process, an example authentication host 114 authenticates the SRAM chip 102 and, thus, the product 110 by comparing challenge-response pairs from the SRAM chip 102 and the database 108. The authentication host 114 may be any device capable of reading data from the SRAM chip 102. In this example, the authentication host 114 is a smart card reader. In this manner, the authentication host 114 may receive data stored in the product 110. However, the product 110 may be an invalid product cloned by an attacker. The authentication host 114 verifies that the product 110 is valid by authenticating the product 110 based on PUF data of the SRAM chip 102. The authentication host 114 applies challenges to the SRAM chip 102 and compares the response to the challenge to challenge response pairs store in the database 108. Based on the comparison, the authentication host 114 determines whether the SRAM chip 102 is valid. An invalid or cloned product cannot produce correct responses to all of the challenges. Thus, the authentication host 114 prevents invalid products from being used.

In operation, the example SRAM chip 102 is created with the semi-conductive material of the example wafer 100. After fabrication of the SRAM chip 102, generation of the PUF begins. The example PUF generator 104 applies a series of challenges to the SRAM chip 102. A memory controller of the SRAM chip 102 applies the challenges to an SRAM array of the SRAM chip 102. The SRAM chip 102 transmits the responses to the challenges to the PUF generator 104. The example PUF generator 104 transmits the challenge-response pairs (e.g., PUF data) to the example database 108 through the example network 106 (e.g., to be stored for later authentication). In some examples, the database 108 may instruct the PUF generator 104 to apply challenges created by the database 108. In some examples, the memory controller of the SRAM chip 102 may create the challenges used to create PUF data. In some examples, the example database 108 and the example SRAM chip 102 communicate directly through network 106 without the need of the PUF generator 104. In some examples, the SRAM chip 102 may send all possible challenge-response pair combinations to the database 108 (e.g., through the database 108) for later authentication of the SRAM chip 102. Alternatively, the SRAM chip 102 may send a portion of the total challenge-response pairs (e.g., PUF data) to the database 108, and send additional challenge-response pairs (e.g. additional PUF data) to the database 108 as needed. The generation of the PUF is further described in FIGS. 3 and 4.

Once the PUF has been generated, the SRAM chip 102 is placed on/embedded in the example product 110 to be used by the example user 112. An authentication process is used to authenticate the product 110 for use. The authentication process begins when the authentication host 114 attempts to authenticate the example product 110. The authentication host 114 may retrieve challenge-response pairs from the example database 108 through the example network 106. The authentication host 114 may then use one or more challenges from the challenge-response pairs to challenge the SRAM chip 102 on the product 110. Once, the SRAM chip 102 applies the challenge, it transmits the response to the authentication host 114. In some examples, the authentication host 114 uses many challenges from the challenge-response pairs to challenge the SRAM chip 102. The authentication host 114 compares the responses from the SRAM chip 102 to the responses from the database 108. If the responses match, the authentication host 114 verifies that the product 110 is valid and the product may be used. If the responses do not match, the authentication host 114 determines that the product 110 is not valid and may notify the database 108, the user 112, a fabricator of the SRAM chip 102, and/or a fabricator the product 110 of the discrepancy. Additionally, the authentication host 114 may set a flag and/or disable the SRAM chip 102 and/or alert the user 112 that the product containing the SRAM chip 102 has been disabled. The authentication process of the SRAM chip 102 is further described in FIGS. 5 and 6.

FIG. 2 is the example SRAM chip 102 of FIG. 1 including an example memory controller 202 to control operation of an example SRAM array 204. The example SRAM chip 102 includes example bit cells 206, 208, 210, 212, 214, example sense amplifiers 216, 218, an example voltage supply line VDD 220, example bitlines 222, 226, 230, example complementary bitlines 224, 228, 232, and example wordlines 234, 236, 238. The example memory controller 202 controls voltages sent to the SRAM array 204 to read/write binary logic values into bit cells of the SRAM array 204. The size of the SRAM chip 102 is based on the number of bit cells (e.g., 1 Kb, 128 Kb, 1 M, etc.) associated with the SRAM array 204.

Example bit cells 206, 208, 210, 212, 214 store binary logic values written by the memory controller 202. The bit cells 206, 208, 210, 212, 214 have two cross-coupled inverters that form a latch circuit. In some examples, the bit cells 206, 208, 210, 212, 214 contain six metal oxide semiconductor field effect transistor (MOSFET) transistors to form the latch circuit, but any amount of transistors may be used to create the bit cells 206, 208, 210, 212, 214. The latch circuit is coupled between a high rail and low voltage rail. The latch is connected between a high storage node and a low storage node. Each of the storage nodes is coupled to a bitline (e.g., the example bitlines 222, 226, 230) or a complementary bitline (e.g., the example complementary bitlines 224, 228, 232), via an access transistors whose gates are connected to a wordline (e.g., the example wordlines 234, 236, 238). The storage nodes are insulated when the access transistors are deactivated by applying a low voltage to the wordlines to allow the bit cells 206, 208, 210, 212, 214 to retain their logic values without refresh.

Example sense amplifiers 216, 218 are used to read the logic values stored in bit cells of the SRAM array 204. The sense amplifiers 216, 218 have a series of transistors configured to amplify a voltage differential between connected bitlines (e.g., the example bitlines 222, 226, 230) and connected complementary bitlines (e.g., the example complementary bitlines 224, 228, 232) to a normal logic level. The sense amplifiers 216, 218 output a logic value associated with a stored logic value of a bit cell based on the voltage differential. For example, the example sense amplifier 216 may output a logic value of '1' when a voltage on bitline BL1 222 is higher than a voltage on complementary bitline BL1 224.

The example memory controller 202 outputs a supply voltage on the example supply voltage line VDD 220. The supply voltage provides power to all bit cells, bitlines, wordlines, and sense amplifiers of the SRAM array 204. In some examples, the example supply voltage line VDD 220 may provide a first voltage to the bit cells and second, third, and fourth voltages to the bitlines, wordlines, and sense amplifiers respectively. Alternatively, the example supply voltage line VDD 220 may be a bus that supplies individual supply voltages to individual bit cells and sense amplifiers.

The example memory controller 202 outputs signals (e.g., voltages) on the example bitlines 222, 226, 230, example complementary bitlines 224, 228, 232, and wordlines 234, 236, 238. The memory controller 202 applies various signals to the various lines to write/read the logic values stored in bit cells 206, 208, 210, 212, 214 as further described below.

During a write operation of an example bit cell 206 (e.g., to write/store a logic value into an example bit cell 206), the example memory controller 202 applies signals to the example bitline 222 and the example complementary bitline 224 associated with the bit cell 206 based on which logic value is to be written. For example, if a '0' is to be written to (e.g., stored in) the bit cell 206, the memory controller 202 applies a '0' to the bitline 222 and a '1' to the complementary bitline 224. The memory controller 202 applies a high voltage to the wordline 234 to store the logic value (e.g., '0') within the bit cell 206.

During a read operation of an example bit cell 206, the memory controller 202 applies pre-charged voltage to example bitline 222 and example complementary bitline 224. The memory controller 202 then applies a read voltage to a wordline 234 associated with the bit cell 206. In this manner, either the example bitline 222 or the example complementary bitline 224 is discharged depending on the stored logic value (e.g., '0' or '1'). The sense amplifier 216 amplifies the small voltage difference between the bitline 222 and the complementary bitline 224 into a larger logic level. The sense amplifier 216 outputs the stored logic value of the bit cell 206 back to the memory controller 202.

For the bit cells 206, 208, 210, 212, 214 to maintain their logic value (e.g., '0' or '1'), a supply voltage must be applied on the supply voltage line VDD 220 to the bit cells 206, 208, 210, 212, 214. If the voltage supply is not applied, all of the bit cells 206, 208, 210, 212, 214 will lose their logic value. However, if the voltage supply is lowered (e.g., outside a normal operating voltage of the SRAM array 204) the bit cells 206, 208, 210, 212, 214 may, or may not, fail. The failure pattern (e.g., which bit cells fail after/during operating outside operating voltage) of the bit cells 206, 208, 210, 212, 214 depend on the values initially stored (e.g., initial logic pattern) of the bit cell 206, 208, 210, 212, 214 and the physical and electrical characteristics of the bit cells 206, 208, 210, 212, 214. The memory controller 202 determines a failure pattern (e.g., read failure pattern) by initializing the bit cells with predetermined logic values (e.g., an initial logic pattern), operating the supply voltage outside the normal operating voltage, reading the stored values of the bit cells, and comparing the stored values with the initial logic pattern.

Figure 3:
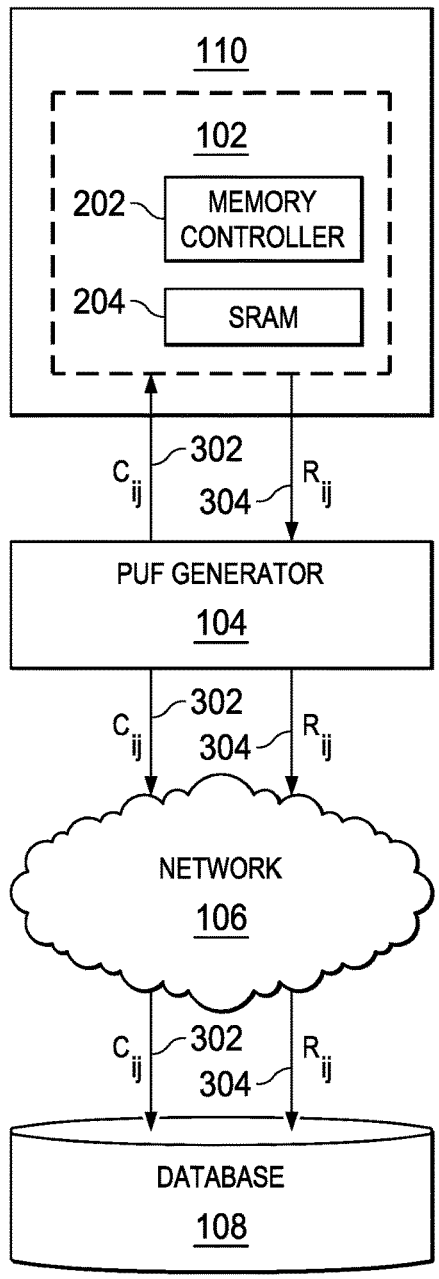
FIG. 3 is an example SRAM in communication with an example database for use in connection with the example PUF techniques disclosed herein.

FIG. 3 is an illustration of the process of generating a PUF for an example product 110 which includes an example SRAM chip 102. The illustration of FIG. 3 includes the example SRAM chip 102, the example product 110, the example PUF generator 104, the example network 106, and the example database 108 of FIG. 1. The illustration of FIG. 3 further includes the example memory controller 202 and the example SRAM array 204 of FIG. 2. The illustration of FIG. 3 further includes example challenges $C_{ij}$ 302 and example responses $R_{ij}$ 304.

The example PUF generator 104 of FIG. 3 transmits instructions to create PUF data using challenges $C_{ij}$ 302 to the example database 108 and to the example memory controller 202 in the SRAM chip 102. The instructions specify PUF parameters for inducing instability to bit cells of the SRAM array 204. For example, the instructions may instruct the memory controller 202 to initiate all the bit cells of the SRAM array 204 to '0.' Additional instructions may include specifying which bit cells to read, when to read the bit cells, what voltage sequence to apply to the SRAM array 204, etc. Once the initial logic pattern (e.g., which bit cells store '1' and which bit cells store '0') is written to the bit cells, one or more voltages outside of the normal operating voltage is applied to induce instability in the bit cells of the SRAM array 204. The memory controller 202 reads the bit cells during, or after, the instability is induced to the bit cells to determine which bit cells fail. A bit cell failure is determined based on incorrect read data sent to the memory controller 202. Alternatively, the instructions may be initiated by the memory controller 202, the database 108, or from any other source outside of the SRAM chip 102. The example challenges are further described in FIGS. 9-20.

Once the instructions are executed by the memory controller 202, the memory controller 202 generates responses $R_{ij}$ 304 (e.g., PUF data) and sends the responses $R_{ij}$ 304 to the PUF generator 104. The PUF generator 104 transmits the challenges $C_{ij}$ 302 and the responses $R_{ij}$ 304 to the example database 108 via the example network 106. The database 108 stores PUF data by associating the responses $R_{ij}$ 304 with the challenges $C_{ij}$ 302. The PUF data will be used to authenticate the SRAM chip 305 at a later time. The database 320 also stores PUF data for other fabricated SRAM chips. In some examples, the SRAM chip 102 may repeat the process with a new set of challenges to increase the size and complexity of the PUF data in the database 108. In some examples, the SRAM chip 102 may initially send a limited number of challenge-response pairs to the PUF generator 104 to be stored in the database 108, and may send additional challenge-response pairs as needed to expand the size of the PUF data (e.g., when the number of challenges sent by an authentication host 114 has been exhausted, when instructions are sent to create more PUF data, etc.).

Figure 4:
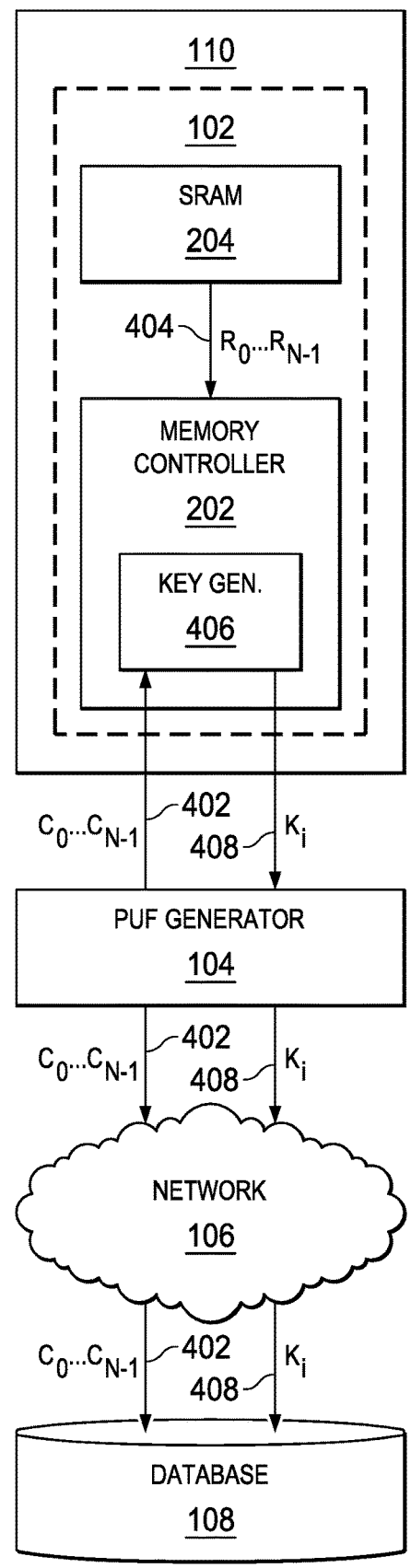
FIG. 4 is an example apparatus to create an example security key based on an example SRAM PUF and store a security key in an example database.

FIG. 4 shows an illustration of an alternative process of generating a PUF for an example SRAM chip 102. The illustration of FIG. 4 includes the example SRAM chip 102, the example product 110, the example PUF generator 104, the example network 106, and the example database 108 of FIG. 1. The illustration of FIG. 4 further includes the example memory controller 202 and the example SRAM array 204 of FIG. 2. The illustration of FIG. 4 further includes example challenges $C_0 \ldots C_{N-1}$ 402, example responses $R_0 \ldots R_{N-1}$ 404, an example key generator 406, example keys $K_i$ 408.

The example PUF generator 104 of FIG. 4 transmits instructions to create PUF data using challenges $C_0 \ldots C_{N-1}$ 402 to the example database 108 and to the example memory controller 202 in the SRAM chip 102. The instructions specify PUF parameters for inducing instability to bit cells of the SRAM array 204. For example, the instructions may instruct the memory controller 202 to initialize all the bit cells of the SRAM array 204 to '0.' Additional instructions may include specifying which bit cells to read, when to read the bit cells, what voltage sequence to apply to the SRAM array 204, etc. Once the initial logic pattern (e.g., which bit cells store '1' and which bit cells store '0') is written to the bit cells, one or more voltages outside of the normal operating voltage is applied to induce instability in the bit cells of the SRAM array 204. The memory controller 202 reads the bit cells during, or after, the instability is induced to the bit cells to determine which bit cells fail. A bit cell failure is determined based on incorrect read data sent to the memory controller 202. Alternatively, the instructions may be initiated by the memory controller 202, the database 108, or from any other source outside of the SRAM chip 102. The example challenges are further described in FIGS. 9-20.

Once the instructions are executed by the memory controller 202, the memory controller 202 generates PUF data by gathering data relating to the responses and sends the PUF data to an example key generator 406. The key generator 406 creates one or more unique keys $K_i$ 408 based on the PUF data. The keys $K_i$ 408 will be used to authenticate the SRAM chip 102 at a later time using either symmetric key or public key cryptography techniques. The keys $K_i$ 408 are securely sent to the PUF generator 104. The PUF generator 104 transmits the $K_i$ 408 to the example database 108 via the example network 106 for storage. The database 108 also stores keys for other fabricated SRAM chips. The SRAM chip 102 may repeat the process with a new set of challenges to generate multiple keys based on different challenges. In some examples, the SRAM chip 102 may initially send a limited number of keys to the PUF generator 104 to be stored in the database 108, and may send additional keys as needed to expand the number of keys for the SRAM chip 102 (e.g., when the number of keys used by an authentication host 114 has been exhausted, when instructions are sent to create more keys, etc.).

FIG. 5 is an example authentication of an example product 110 containing an example SRAM chip 102. The illustration includes the example SRAM chip 102, the example product 110, the example authentication host 114, the example network 106, and the example database 108 of FIG. 1. The illustration further includes example challenges $C_{ij}$ 502, example responses $R_{ij}$ 504, an example ok/disable signal 506, and example database responses $dR_{ij}$ 508.

When a user of the example product 110 attempts to use the product 110, the example authentication host 114 authenticates the example SRAM chip 102 associated with the product 110. The example authentication host 114 authenticates the product 110 by sending instructions to the SRAM chip 102 including example challenges $C_{ij}$ 502. The example authentication host 114 also sends the example challenges $C_{ij}$ 502 as well as product 110 identification information to the example database 108 via the example network 106. In response to receiving the challenges $C_{ij}$ 502 and identifying information from the authentication host 114, the example database 108 sends stored database responses $dR_{ij}$ 508 associated with the challenges $C_{ij}$ 502 for the SRAM chip 102. When the SRAM chip 102 receives the challenges $C_{ij}$ 502 from the authentication host 114, a memory controller 202 of the SRAM chip 102 applies the challenges to an SRAM array 204 to determine and transmit the example responses $R_{ij}$ 504 to the authentication host 114. Alternatively, the authentication host 114 may first retrieve PUF data from the database 108 before applying a challenge $C_{ij}$ 502 to the SRAM chip 102. In this manner, the authentication host 114 can use stored challenge-response pairs from the PUF data in the database 108 to test the SRAM chip 102 (e.g., when the database 108 contains a limited number of challenge-response pairs).

In response to receiving the example responses $R_{ij}$ 504 and the example database responses $dR_{ij}$ 508 via the network 106, the example authentication host 114 compares the responses $R_{ij}$ 504 and the database responses $dR_{ij}$ 508. If the PUF data (e.g., challenge-response pairs) acquired from example SRAM chip 102 matches the PUF data from the database 108, the product 110 is authenticated. Once authenticated, the authentication host 114 transmits an example 'OK' (e.g., approval) signal 506 to the product 110 and the product 110 can be utilized. However, if the data from two PUFs do not match, the example authentication host 114 sends a disable signal 506 to the SRAM chip 102 to deactivate the SRAM chip 102. Additionally, the authentication host 114 may contact a user of the product 110 (e.g., the example user 112 of FIG. 1), the database 108, and/or the manufacturer of the product 110 and/or SRAM chip 102, to indicate that the product 110 has been disabled via a wired or wireless connection. Alternatively, the example authentication host 114 may send a message to another server and/or database to indicate a discrepancy between the PUF of the SRAM chip 102 and the PUF stored in the example database 108. Alternatively, the SRAM chip 102 may send a signal to the user to indicate the discrepancy between the PUF of the SRAM chip 102 and the PUF stored in the database 108.

FIG. 6 is an example authentication of an example product 110 containing an example SRAM chip 102. The illustration includes the example SRAM chip 102, the example product 110, the example authentication host 114, the example network 106, and the example database 108 of FIG. 1. The illustration further includes example challenges $C_0 \ldots C_{N-1}$ 602, example HMAC 604, an example ok/disable signal 606, and an example database key $dK_i$ 608.

When a user of the example product 110 attempts to use the product 110, the example authentication host 114 authenticates the example SRAM chip 102 associated with the product 110. The example authentication host 114 authenticates the product 110 by sending instructions to the SRAM chip 102 including example challenges $C_0 \ldots C_{N-1}$ 602. The example authentication host 114 also sends the example challenges $C_0 \ldots C_{N-1}$ 602 as well as product 110 identification information to the example database 108 via the example network 106. In response to receiving the example challenges $C_0 \ldots C_{N-1}$ 602 and identifying information from the authentication host 114, the example database 108 sends an example stored database key $dK_i$ 608 for the SRAM chip 102. When the SRAM chip 102 receives challenges from the authentication host 114, a memory controller 202 in the SRAM chip 102 applies the challenges $C_0 \ldots C_{N-1}$ 602 to the SRAM array 204 to determine the corresponding key. The SRAM chip 102 uses this key to compute an example HMAC 604 to be transmitted to the authentication host 114. Alternatively, the authentication host 114 may first retrieve the challenges $C_0 \ldots C_{N-1}$ 602 from the database 108 before applying the challenges $C_0 \ldots C_{N-1}$ 602 to the SRAM chip 102. In this manner, the authentication host 114 can use stored challenge-response pairs from PUF data in the database 108 to test the SRAM chip 102 (e.g., when the database 108 contains a limited number of challenge-response pairs).

In response to receiving the example HMAC 604, the example authentication host 114 uses the database key $dK_i$ 608 from the network 106 to compute the corresponding $dHMAC_i$. The authentication host 114 then compares the chip's HMAC 604 to the $dHMAC_i$ it computed based on the database key $dK_i$ 608 from the network 106. If the HMAC 604 acquired from example SRAM chip 102 matches the $dHMAC_i$ computed based on $dK_i$ 608 from the database 108, the product 110 is authenticated, an 'OK' (e.g., approval) signal 606 is sent to the product 110, and the product 110 can be utilized. However, if the two HMACs do not match, the authentication host 114 sends a disable signal 606 to the SRAM chip 102 to deactivate the SRAM chip 102. Additionally, the authentication host 114 may contact a user of the product 110 (e.g., the example user 112 of FIG. 1), the database 108, and/or the manufacturer of the product 110 and/or SRAM chip 102 to indicate that the product 110 has been disabled via a wired or wireless connection. Alternatively, the example authentication host 114 may send a message to another server and/or database to indicate a discrepancy between the PUF of the SRAM chip 102 and the PUF stored in the example database 108. Alternatively, the SRAM chip 102 may send a signal to the user to indicate the discrepancy between the PUF of the SRAM chip 102 and the PUF stored in the database 108.

Figure 7:
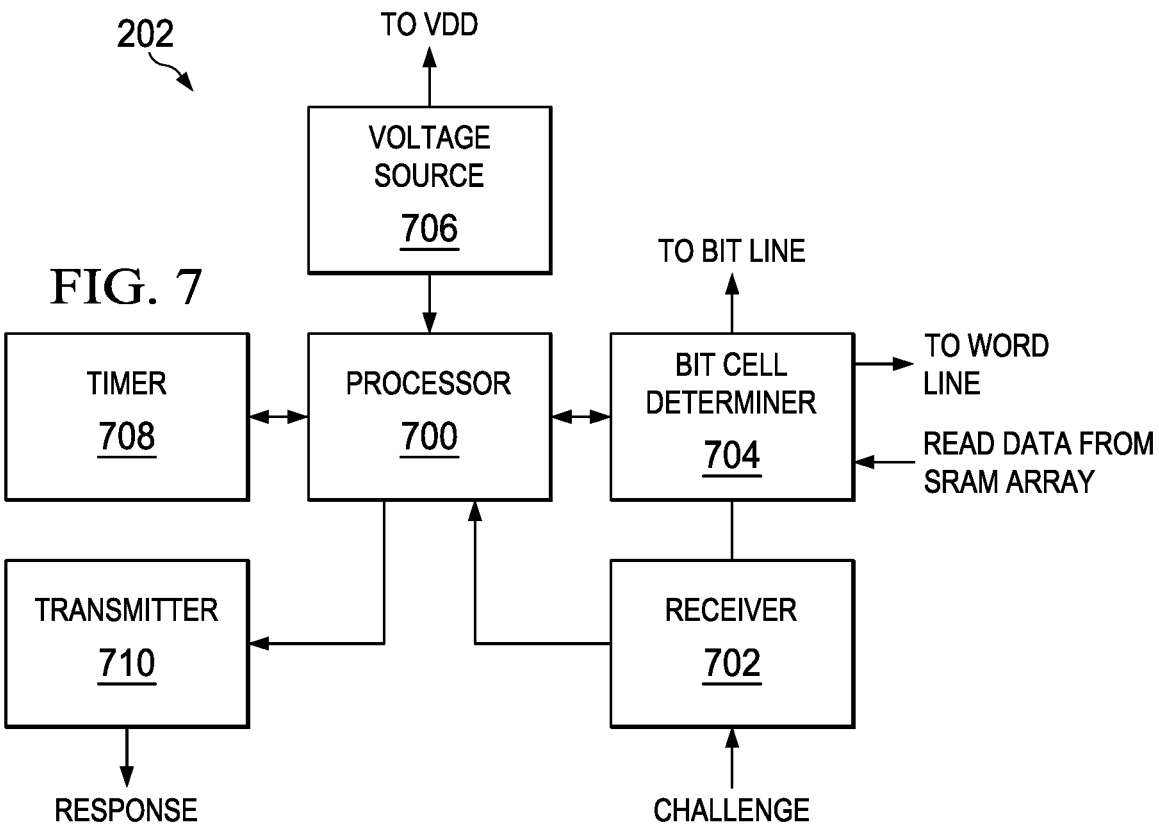
FIG. 7 is an example memory controller to control an SRAM circuit to create a PUF.

FIG. 7 is a block diagram of an example implementation of the example memory controller 202 of FIG. 2, disclosed herein, to create a PUF and/or authenticate a chip containing an SRAM. While the example memory controller 202 of FIG. 7 is described in conjunction with the example SRAM array 204, the memory controller 202 may be utilized to control any memory array. The example memory controller 202 is implemented to control the example SRAM array 204 in the example product 110, and/or any device where SRAM is used.

The memory controller 202 of FIG. 7 includes an example processor 700, an example receiver 702, an example bit cell determiner 704, an example voltage source 706, an example timer 708, and an example transmitter 710. The processor 700 receives challenges, executes instructions, processes data, and transmits responses to a PUF generator and/or an authentication host 114.

The example receiver 702 receives data from an external device via a wired or wireless connection and sends the received PUF data to the processor 700 for further processing. For example, the receiver 702 receives challenges from the example PUF generator 104, the example database 108, and/or the example authentication host 114 and sends the PUF data to the processor 700 for further processing.

The example bit cell determiner 704 determines which wordlines and bitlines are associated with a bit cell. For example, the processor 700 may instruct the bit cell determiner 704 to read a particular logic value from the bit cell. In this manner, the example bit cell determiner 704 determines which bitlines and which wordline are associated with the bit cell. The example bit cell determiner 704 applies a signal to the appropriate wordlines and bitlines to read/write the logic value stored in the bit cell. The example bit cell determiner 704 receives the read data from sense amplifiers 216, 218 of the SRAM array 204 of FIG. 2 and sends the read data to processor 700 for further processing. The example bit cell determiner 704 sends the read data to the processor 700 for further processing. Additionally, the example bit cell determiner 704 may write a logic value into a bit cell of the SRAM array 204. In this manner, the example bit cell determiner 704 applies a signal to appropriate wordline and bitlines to write the initial logic pattern into the bit cells.

The example voltage source 706 applies the supply voltage to the supply voltage lines VDD 220 of FIG. 2. In some examples, the example voltage source 706 is a voltage regulator capable of outputting one or more voltage levels. In some examples, the example voltage source 706 is a voltage source that can be lowered by enabling a diode-connected transistor in series with the voltage supply. Alternatively, the voltage source 706 can be any circuit capable of outputting one or more voltage levels. When a challenge is applied to the SRAM array 204, the example voltage source 706 outputs one or more voltages outside the normal operating voltage, as further described in FIGS. 9-20.

The example timer 708 records and tracks a duration of time that a supply voltage is lowered outside the normal operating voltage of the SRAM array 204. The timer 708 may be implemented using hardware, software, and/or firmware. The example timer 708 communicates the recorded time to the example processor 700 for further processing.

The example transmitter 710 receives data from the processor 700 and transmits the PUF data to an external device via a wired or wireless connection. For example, the transmitter 710 transmits responses and identification data from the memory controller 202 to the example PUF generator 104, the example authentication host 114, and/or the example database 108 of FIG. 1.

In operation, the example receiver 702 of FIG. 7 receives data, via wired or wireless communication, from the example PUF generator 104, the example authentication host 114, and/or the example database 108. The example processor 700 receives and processes the data from the example receiver 702. The data may contain instructions including challenges to be performed by the processor 700 to create a PUF. The instructions may include PUF parameters including which bit cells are to be monitored, initial conditions for the challenge(s) (e.g., initial logic pattern of the bit cells), the type of challenge(s), the number of challenges, and a type of response to be sent to the example PUF generator 104, the example authentication host 114, and/or the example database 108. For example, the challenge may be a bit cell read failure pattern during a read operation while a supply voltage of the example SRAM array 204 is lower than the normal operating voltage and the initial values of all of the bit cells of the SRAM array 204 are '1.'

When the example processor 700 applies the challenges to the SRAM array 204 of FIG. 1, the processor 700 applies initial conditions received by the example receiver 702 by writing an initial logic pattern based on the initial conditions of the PUF parameters. The processor 700 sends the initial logic pattern to the example bit cell determiner 704. The bit cell determiner 704, equipped with the initial logic pattern, determines which bitline(s) and wordline(s) are associated with the bit cell(s) to be written. The bit cell determiner 704 applies an appropriate voltage to the wordlines and bitlines associated with the bit cell(s) to write an initial value for the bit cell(s). The bit cell determiner 704 may repeat this process until all, or any portion, of the bit cell values have been written to the bit cells.

Once the initial logic pattern has been applied to the bit cells of the example SRAM array 204, the example processor 700 of FIG. 7 initiates an example timer 708 and instructs an example voltage source 706 to control the supply voltage line VDD 220 of the SRAM array 204. In this manner, the example voltage source 706 applies one or more supply voltages outside the normal operating voltage of the SRAM array 204 for a duration of time, as determined by the PUF parameters, to create PUF data based on bit cell failures. The duration of time is monitored by the example timer 708. The example bit cell determiner 704, equipped with the challenge data, determines which bitline(s) and wordline(s) are associated with the bit cell(s) to be read. The example bit cell determiner 704 applies an appropriate voltage to the word and bitlines associated with the bit cell(s) to read the logic value(s) stored in the bit cell(s). In some examples, the example timer 708 enables sense amplifiers of the SRAM array 204 to read the logic value(s) stored in the bit cell(s) at predetermined increments of time.

The example bit cell determiner 704 receives the read data from sense amplifiers associated with the selected bit cells and sends the read data to the example processor 700. The processor determines a read failure pattern based on incorrect read data sent from the example bit cell determiner 704. For example, if a logic value of '1' was written to a bit cell and after applying the challenge a logic value of the bit cell was read as a logic value of '0,' the example processor 700 determines that the bit cell failed during the challenge. The processor may repeat the challenge for a new bit cell to generate a bit cell read failure pattern based on the PUF parameters. During PUF generation, the processor 700 may change the parameters of the challenge (e.g., the supply voltage level, the amount of time the supply voltage is altered, the time when the sense amplifiers are enabled, etc.) and rerun the challenge to obtain additional PUF data. Additionally or alternatively, the read failure pattern may determine the input for another pattern, so that PUF data may be determined based on a recursive challenge. Once PUF data is obtained from the measurements, the processor 700 sends the response to the example transmitter 710. Alternatively, the processor 700 may increase the number and complexity of the challenges by applying a function to the response. For example, the processor 700 may apply a function (e.g., a logic function including and, or, exclusive or (XOR), not, etc.) to two or more bit cell values after a challenge is applied. In this manner, the processor 700 may relay the result of the function to the example transmitter 710.

The example transmitter 710 of FIG. 7 transmits the response, via wired or wireless communication, to the example PUF generator 104, the example authentication host 114, and/or the example database 108. Additionally, the transmitter 710 may send the PUF parameters to the example PUF generator 104, the example authentication host 114, and/or the example database 108. This may be done if, for example, the challenges were initiated by the processor 700 or to verify that the correct challenge was performed on the SRAM array 204. Additionally, the example receiver 702 may receive an OK, error, and/or disable message from the example PUF generator 104, the example authentication host 114, and/or the example database 108 once the SRAM circuit has been authenticated or invalidated. Alternatively, the example processor 700 may create a key based on the PUF data. In this manner, a cryptographic hash function may be applied to the key creating a HMAC. Additionally, the transmitter 710 may transmit the HMAC to the example PUF generator 104, the example authentication host 114, and/or the example database 108.

While example manners of implementing the example memory controller 202 of FIG. 2 are illustrated in FIG. 7, elements, processes and/or devices illustrated in FIG. 7 may be combined, divided, re-arranged, omitted, eliminated and/or implemented in any other way. Further, the example processor 700, the example receiver 702, the example bit cell determiner 704, the example voltage source 706, the example timer 708, the example transmitter 710, and/or, more generally, the example memory controller 202 of FIG.

7 may be implemented by hardware, machine readable instructions, software, firmware and/or any combination of hardware, machine readable instructions, software and/or firmware. Thus, for example, any of the example processor 700, the example receiver 702, the example bit cell determiner 704, the example voltage source 706, the example timer 708, the example transmitter 710, and/or, more generally, the example memory controller 202 of FIG. 7 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 700, the example receiver 702, the example bit cell determiner 704, the example voltage source 706, the example timer 708, the example transmitter 710, and/or, more generally, the example memory controller 202 of FIG. 7 is/are hereby expressly defined to include a tangible computer readable storage device or storage disk such as a memory, a digital versatile disk (DVD), a compact disk (CD), a Blu-ray disk, etc. storing the software and/or firmware. Further still, the example memory controller 202 of FIG. 7 include elements, processes and/or devices in addition to, or instead of, those illustrated in FIGS. 8, 9, 11, 13, 15, 17, and 19, and/or may include more than one of any or all of the illustrated elements, processes and devices.

Flowcharts representative of example machine readable instructions for implementing the memory controller 202 of FIG. 7 are shown in FIGS. 8, 9, 11, 13, 15, 17, and 19. In the examples, the machine readable instructions comprise a program for execution by a processor such as the processor 2112 shown in the example processor platform 2100 discussed below in connection with FIG. 21. The program may be embodied in machine readable instructions stored on a tangible computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example program is described with reference to the flowcharts illustrated in FIGS. 8, 9, 11, 13, 15, 17, and 19, many other methods of implementing the example memory controller 202 of FIG. 7 may alternatively be used. For example, the order of execution of the blocks may be changed, and/or some of the blocks described may be changed, eliminated, or combined.

As mentioned above, the example processes of FIGS. 8, 9, 11, 13, 15, 17, and 19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8, 9, 11, 13, 15, 17, and 19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
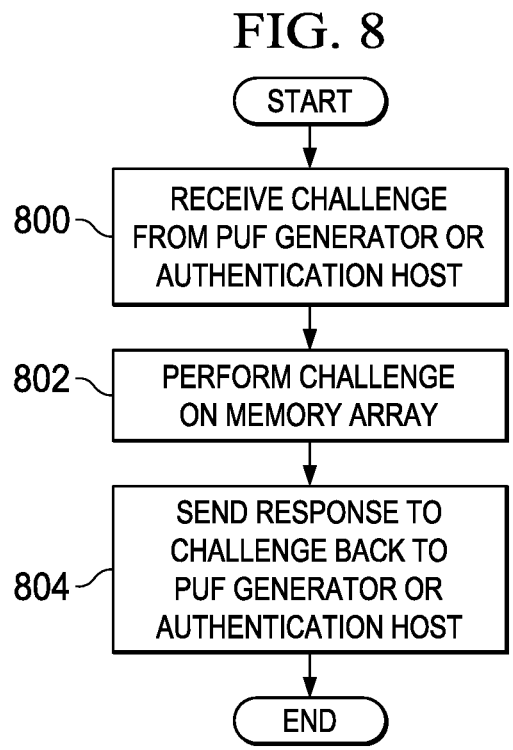
FIG. 8 is a flowchart representative of example machine readable instructions that may be executed to implement the example memory controller of FIG. 7 to authenticate and/or generate a PUF on the example SRAM chip 102.

The example machine readable instructions illustrated in FIG. 8 may be executed to cause the memory controller 202 of FIG. 7 to create and/or authenticate a PUF described in conjunction with FIG. 8. Although the flowchart of FIG. 8 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 8 is a flowchart representative of example machine readable instructions that may be executed to implement the example memory controller 202 of FIG. 7 to generate and/or authenticate a PUF of the example SRAM chip 102. PUF data is generated by the example PUF generator 104 of FIG. 1. Once the example PUF generator 104 stores PUF data for the SRAM chip 102 in the example database 108, the SRAM circuit can be authenticated by the example authentication host 114. Both the example PUF generator 104 and the example authentication host 114 send one or more challenges to the SRAM chip 102 to receive a response that will be stored and/or used to authenticate the SRAM chip 102.

At block 800, the example receiver 702 receives a challenge from the example PUF generator 104 and/or the example authentication host 114. The challenge may contain instructions including PUF parameters (e.g., initial logic values, type of supply voltage sequence, bit cells to be read, type of response to be sent back to the authentication host 114, etc.). Additionally, the challenge may contain instructions for multiple bit cells to be read and the processor 700 may apply a function (e.g., a logic function including and, or, exclusive or (XOR), not, etc.) to values read from the bit cells. In this manner, the number of challenges that can be used to generate the PUF can be further increased since there are many possible combinations of bit cells and functions to be applied. Alternatively, the processor 700 may generate the challenge.

At block 802, the processor 700 instructs the bit cell determiner 704 and the voltage source 706 to apply the challenge on the SRAM array 204 given the PUF parameters of the challenge. The challenge-response pairs used to generate and/or authenticate the PUF are determined using various supply voltage outputs, applied by the voltage source 706, as further described in FIGS. 9-20.

At block 804, the example transmitter 710 transmits PUF data to the example PUF generator 104 and/or the example authentication host 114. The PUF data may include the response, the challenge, and/or any other data relating to the challenge, the response, or the SRAM chip 102. During the PUF generation process, the response is transmitted to the PUF generator 104 to store PUF data relating to the challenge-response pair in the example database 108. During the authentication process, the authentication host 114 compares the response sent from the memory controller 202 with the response previously stored in the example database 108 to verify the SRAM chip 102. Equipped with the response, the authentication host 114 can compare the response to PUF data stored in the database 108 to determine if the SRAM chip 102 is valid or not. Alternatively, the example processor 700 may use the PUF data to create a key. In this manner, a cryptographic hash function may be applied to the key creating a HMAC. The HMAC may be sent to the authentication host 114. The authentication host 114 compares the HMAC from the SRAM chip 102 to an HMAC the host computes based on a key stored in the database 108.

Additionally, the authentication host 114 may send a signal back to the SRAM array 204 based on the comparison of the PUF data to the response. For example, if the PUF data matches the response, a signal may be sent to the receiver 702 of the memory controller 202 verifying that a product containing the SRAM chip 102 can be utilized. If the PUF data does not match the response, a signal may be sent to disable and/or erase any data on the SRAM chip 102 or disable and/or erase any data on another circuit in the product 110 containing the SRAM chip 102.

Figure 9:
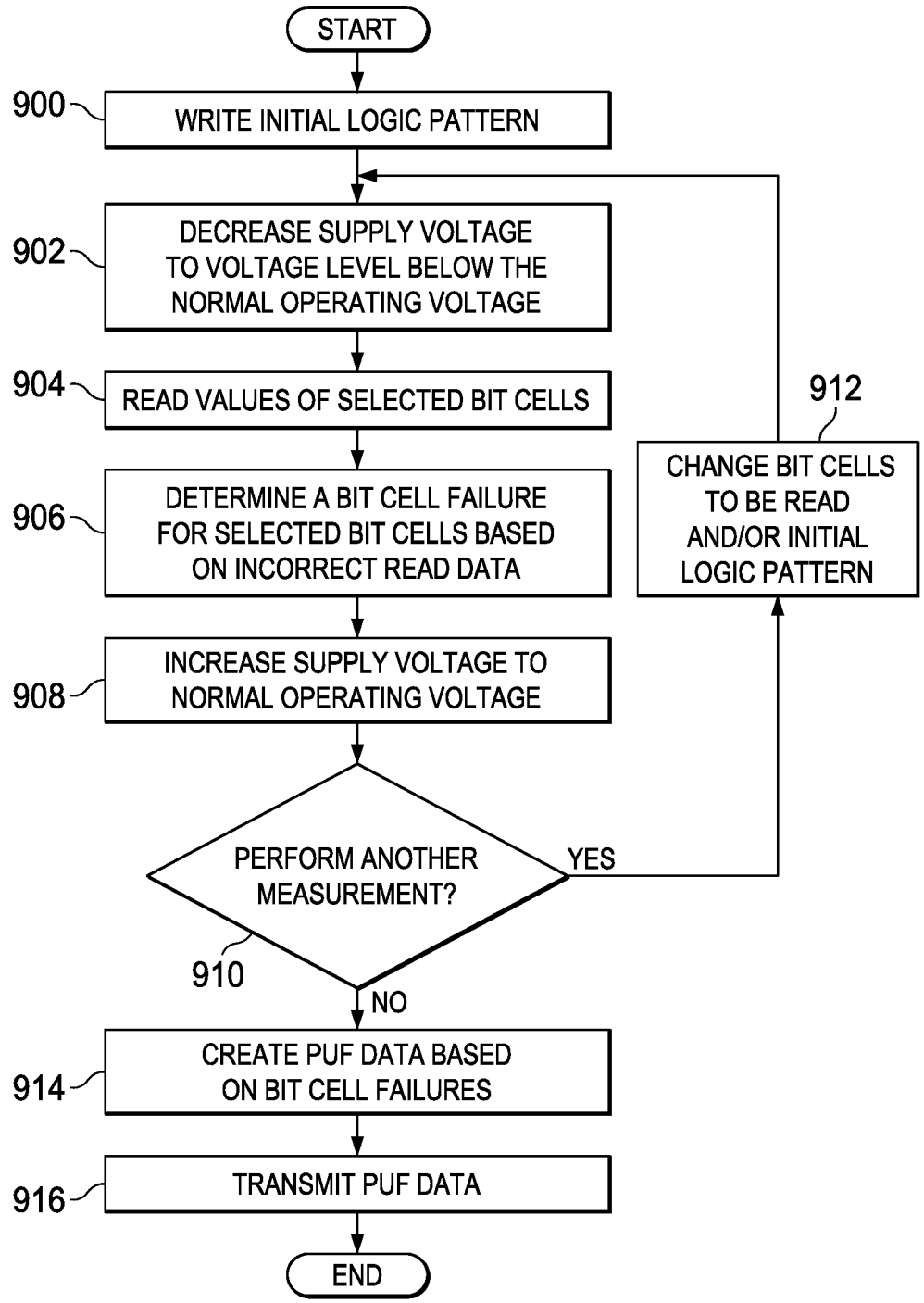
FIG. 9 is a flowchart representative of example machine readable instructions that may be executed to implement the example memory controller 202 of FIG. 7 to create a PUF using the supply voltage sequence of FIG. 10.

The example machine readable instructions illustrated in FIG. 9 may be executed to cause the memory controller 202 of FIG. 7 to create a PUF. Although the flowchart of FIG. 9 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 9 is a flowchart representative of example machine readable instructions that may be executed to implement the example memory controller 202 of FIG. 7 to create a PUF. The method of FIG. 9 begins when the receiver 702 of FIG. 7 receives instructions to create PUF data. The instructions could be sent from the example PUF generator 104, the example authentication host 114, and/or the example database 108. For example, instructions may be sent by the PUF generator 104 when the SRAM chip 102 is fabricated or when it has been determined that the unique challenges stored in the database have been applied to the SRAM array 204 and more challenge-response pairs are needed to increase the size of the PUF data in the database 108. Alternatively, the instructions may be sent by the authentication host 114 to compare a response of the SRAM chip 102 to a response stored in the example database 108 to authenticate the SRAM chip 102. In some examples, the instructions may be created internally by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 900, the example processor 700 instructs the bit cell determiner 704 and the voltage source 706 to apply voltages to write a set of values (e.g., an initial logic pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 902, the example voltage source 706 decreases the supply voltage to a voltage level below the normal operating voltage. The voltage level may be any level below the normal operating voltage.

At block 904, the example processor 700 sends instructions to the example bit cell determiner 704 to apply appropriate voltages to the word and bitlines to read the bit cells. Sense amplifiers associated with the SRAM determine the stored values of the bit cells and send the stored values to the example bit cell determiner 704. The bit cell determiner 704 determines the stored values of the bit cells and sends read data based on the stored values to the processor 700. At block 906, the example processor 700 may determine a bit cell read failure pattern for the selected bit cells based on incorrect read data. Incorrect read data corresponds to receiving a stored value from the sense amplifiers that is not the same as the value written to the bit cell. The bit cell read failure pattern is a determination of which bit cells failed and/or which bit cells did not fail. After the bit cells have been read, the voltage source 706 returns the supply voltage to the normal operating voltage (block 908).

At block 910, the example processor 700 determines whether or not an additional measurement is needed. For example, the PUF parameters may require a PUF based on different bit cells at multiple initial stored patterns. If the processor 700 determines that more PUF data is needed, the processor 700 will select new bit cells and/or a new initial logic pattern to apply to the SRAM array 204 (block 912). If the processor 700 finished performing read measurements, the processor 700 creates PUF data based, in part, on bit cell read failures (block 914). Alternatively, the processor 700 may apply a function to the response. For example, the processor 700 may apply a function (e.g., a logic function including and, or, XOR, not, etc.) to two or more bit cell values after a challenge is applied to create additional PUF data.

At block 916, the example transmitter 710 transmits the PUF data to the example PUF generator 104 and/or the example authentication host 114. In some examples, the PUF generator 104 stores the PUF data in the example database 108 via network 106. Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may be sent to the example PUF generator 104 (e.g., to store PUF data) and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 10:
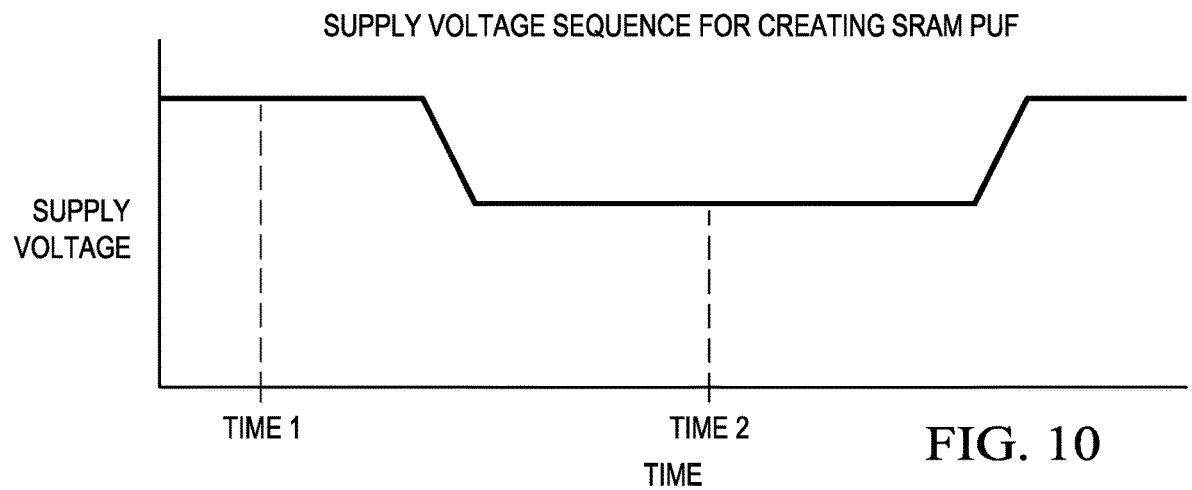
FIG. 10 is a graph illustrating a supply voltage sequence for the example SRAM chip 102 of FIG. 2 based on bit cell read failures at a supply voltage lower than a normal operating supply voltage of the SRAM array.

FIG. 10 illustrates an example supply voltage that may be output by the example voltage source 706 of FIG. 7 to facilitate the generation of PUF data as described in the flowchart of FIG. 9. At time 1, the voltage source 706 outputs the supply voltage at a normal operating voltage (e.g., 1.5 V). The example processor 700 sends instructions to the example bit cell determiner 704 to write the initial logic pattern for bit cells of an SRAM array 204 (e.g., which bit cells store a logic value of '0' and which bit cells store a logic value of '1'). Once the initial logic pattern have been written to the bit cells, the processor 700 sends instructions to the example voltage source 706 to decrease the supply voltage to a voltage below the normal operating voltage of the SRAM array 204 (e.g., 0.7 V). Operating at a supply voltage outside the normal operating voltage may cause bit cells of the SRAM array 204 to fail (e.g., lose their stored logic values or provide the wrong value when being read). In this manner, a PUF may be generated based on a read failure pattern (e.g. which bit cells failed given the initial stored logic pattern) of an SRAM array 204.

At time 2 of FIG. 10, the example processor 700 sends instructions to the example bit cell determiner 704 to read logic values stored in the bit cells. The bit cell determiner 704 receives read data from the stored values of the bit cells and sends the read data to the processor 700 to determine which bit cells failed. A read failure pattern of the bit cells can be determined based on which bit cells failed. The example processor 700 sends PUF data (e.g., the read failure pattern) to the example transmitter 710 to transmit the PUF data to the example PUF generator 104, the example authentication host 114, and/or the example database 108. Additionally, the processor 700 may create more PUF data by changing the initial logic pattern and repeating the process to determine a new read failure pattern based on the new initial logic pattern. Additionally, the example processor 700 may create more PUF data at a later time (e.g., when the number of challenges available to an authentication host 114 has been exhausted, when instructions are sent to create more PUF data, etc.).

Figure 11:
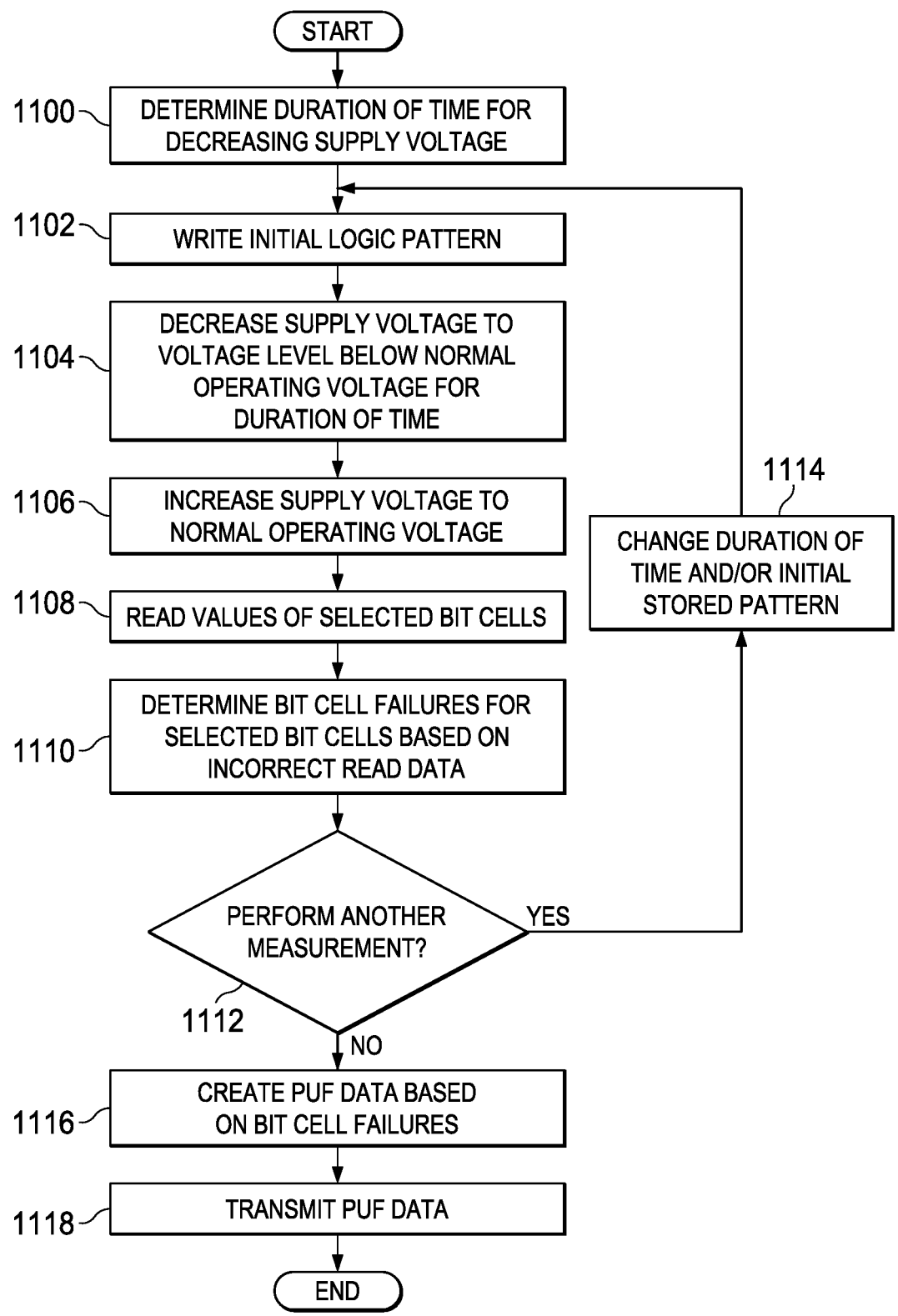
FIG. 11 is a flowchart representative of example machine readable instructions that may be executed to implement the example memory controller 202 of FIG. 7 to create a PUF using the supply voltage sequence of FIG. 12.

The example machine readable instructions illustrated in FIG. 11 may be executed to cause the memory controller 202 of FIG. 7 to create a PUF. Although the flowchart of FIG. 11 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 11 is a flowchart representative of example machine readable instructions that may be executed to implement the example memory controller 202 of FIG. 7 to create a PUF. The method of FIG. 11 begins when the example receiver 702 receives instructions to create PUF data. The instructions could be sent from the example PUF generator 104, the example authentication host 114, and/or the example database 108 when the example SRAM chip 102 is fabricated or when it has been determined that the unique challenges stored in the database 108 have been exhausted and more challenge-response pairs are needed to increase the size of the PUF data in the database 108 to authenticate the SRAM chip 102. In some examples, the instructions may be created by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 1100, the processor 700 determines a duration of time for decreasing a supply voltage to a voltage outside the normal operating voltage of the SRAM array 204. Different durations of time may produce different bit cell read failure patterns due to physical and electrical characteristics of the bit cells, thus a PUF may be generate based, in part, on a bit cell read failure pattern at varying durations of time that the supply voltage is operated outside the normal operating voltage.

At block 1102, the example processor 700 instructs the example bit cell determiner 704 to apply voltages to the SRAM array 204 to write a set of values (e.g., an initial pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 1104, the example voltage source 706 decreases the supply voltage to a voltage level below the normal operating voltage. The voltage level may be any level below the normal operating voltage. The example timer 708 monitors the amount of time that the voltage level is below the normal operating voltage. After the example timer 706 has determined that the duration of time has expired, the voltage source 706 returns the supply voltage to the normal operating voltage (block 1106).

At block 1108, the example processor 700 sends instructions to the example bit cell determiner 704 to apply appropriate voltages to the word and bitlines to read the bit cells. Sense amplifiers associated with the SRAM determine the stored values of the bit cells and send the stored values to the example bit cell determiner 704. The bit cell determiner 704 determines the stored values of the bit cells and sends read data based on the stored values to the processor 700. At block 1110, the example processor 700 may determine a bit cell read failure pattern for the selected bit cells based on incorrect read data. Incorrect read data corresponds to receiving a stored value from the sense amplifiers that is not the same as the value written to the bit cell. The bit cell read failure pattern is a determination of which bit cells failed and/or which bit cells did not fail.

At block 1112, the example processor 700 determines whether or not an additional measurement is needed. For example, the PUF parameters may require a PUF based on different durations of time that the supply voltage is operated at a voltage outside the normal operating voltage and/or different initial stored patterns. If the processor 700 determines that more PUF data is needed, the processor 700 will select a new duration of time and/or a new initial logic pattern to apply to the SRAM array 204 (block 1114). If the processor 700 finished performing read measurements, the processor 700 creates PUF data based, in part, on bit cell read failures (block 1116). Alternatively, the processor 700 may apply a function to the response. For example, the processor 700 may apply a function (e.g., a logic function including and, or, XOR, not, etc.) to two or more bit cells after a challenge is applied to create additional PUF data.

At block 1118, the example transmitter 710 transmits the PUF data to the example PUF generator 104 and/or the example authentication host 114. In some examples, the PUF generator 104 stores the PUF data in the example database 108 via the example network 106. Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may be sent to the example PUF generator 104 (e.g., to store PUF data) and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 12:
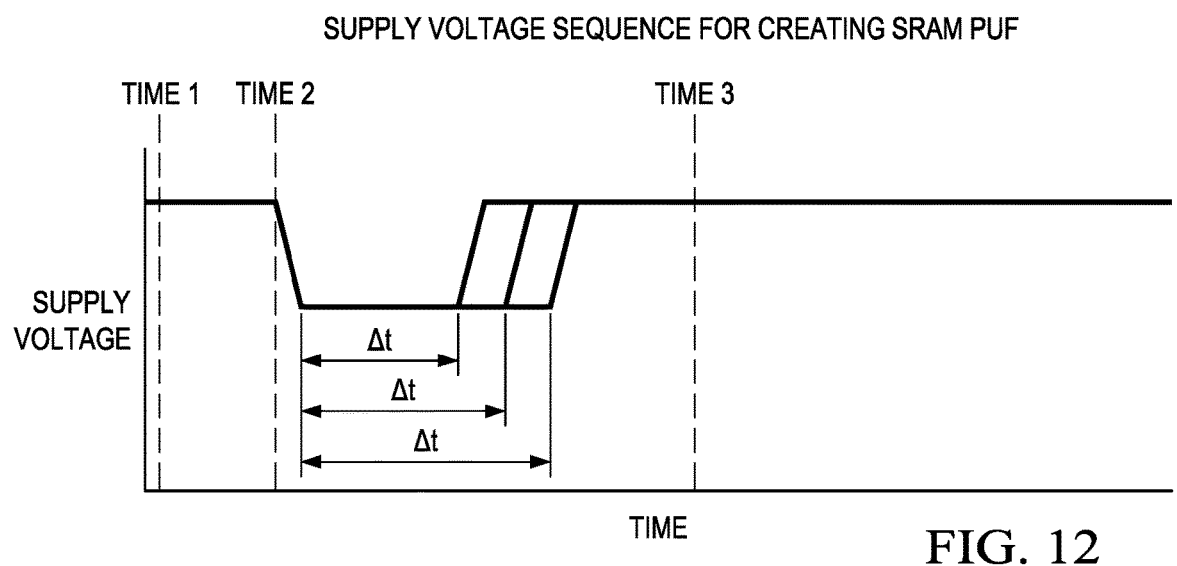
FIG. 12 is a graph illustrating another supply voltage sequence for the example SRAM chip 102 of FIG. 1 based on bit cell read failures at a supply voltage lower than the normal operating supply voltage of the SRAM for a variable duration of time.

FIG. 12 illustrates an example supply voltage that may be output to create PUF data based, in part, on a duration of time that the supply voltage is operated outside a normal operating voltage, as described in the flowchart of FIG. 11. At time 1, the supply voltage is at a normal operating voltage (e.g., 1.5 V). The example processor 700 of FIG. 7 sends instructions to the example bit cell determiner 704 to write the initial logic pattern for bit cells of an SRAM array 204 (e.g., which bit cells store a logic value of '0' and which bit cells store a logic value of '1'). At time 2, the processor 700 sends instructions to the example timer 708 and the example voltage source 706 to decrease the supply voltage to a voltage (e.g., 0.7 V) below the normal operating voltage of the SRAM array 204 for a predetermined duration of time. The example timer 708 tracks the duration of time the voltage source 706 operates at the decreased supply voltage. The timer 708 also determines when the duration of time set by the processor 700 has expired so that the supply voltage can return to the normal operating voltage. Once the duration of time has expired, the processor 700 sends instructions to the voltage source 706 to restore the supply voltage to the normal operating voltage. Operating at a supply voltage outside the normal operating voltage may cause bit cells of the SRAM array 204 to fail (e.g., lose their stored logic values). In this manner, a PUF may be generated based on a read failure pattern (e.g. which bit cells failed given the initial stored logic pattern) for bit cells and a duration of time that the supply voltage is operated outside the normal operating voltage of an SRAM array 204.

At time 3 of FIG. 12, after the supply voltage has returned to the normal operating voltage, the example processor 700 sends instructions to the example bit cell determiner 704 to read logic values stored in the bit cells. The bit cell determiner 704 receives read data from stored values of the bit cells and sends the read data to the processor 700 to determine which bit cells failed. A read failure pattern of the bit cells can be determined based on which bit cells failed. Additionally, the example processor 700 may create more PUF data by changing the initial logic pattern and/or changing the duration of time that the supply voltage is operated outside the normal operating voltage of the SRAM array 204. The processor 700 repeats the process to determine a new read failure pattern based on the new initial logic pattern and/or the new duration of time. For example, the processor may apply a new challenge with the same initial logic pattern as the previous challenge, but with a different duration of time (e.g., Δt) to create a new read failure pattern. In this manner, the example processor 700 may correlate the two, or more, read failure patterns to create a PUF based on the different durations of time. The example processor 700 sends PUF data (e.g., the read failure pattern) to the example transmitter 710 to transmit the PUF data to the example PUF generator 104, the example authentication host 114, and/or the example database 108 via network 106. Additionally, the processor 700 may create more PUF data by changing the initial logic pattern and repeating the process to determine a new read failure pattern based on the new initial logic pattern. Additionally, the example processor 700 may create more PUF data at a later time (e.g., when the number of challenges stored in the database 108 has been exhausted, when instructions are sent to create more PUF data, etc.).

Figure 13:
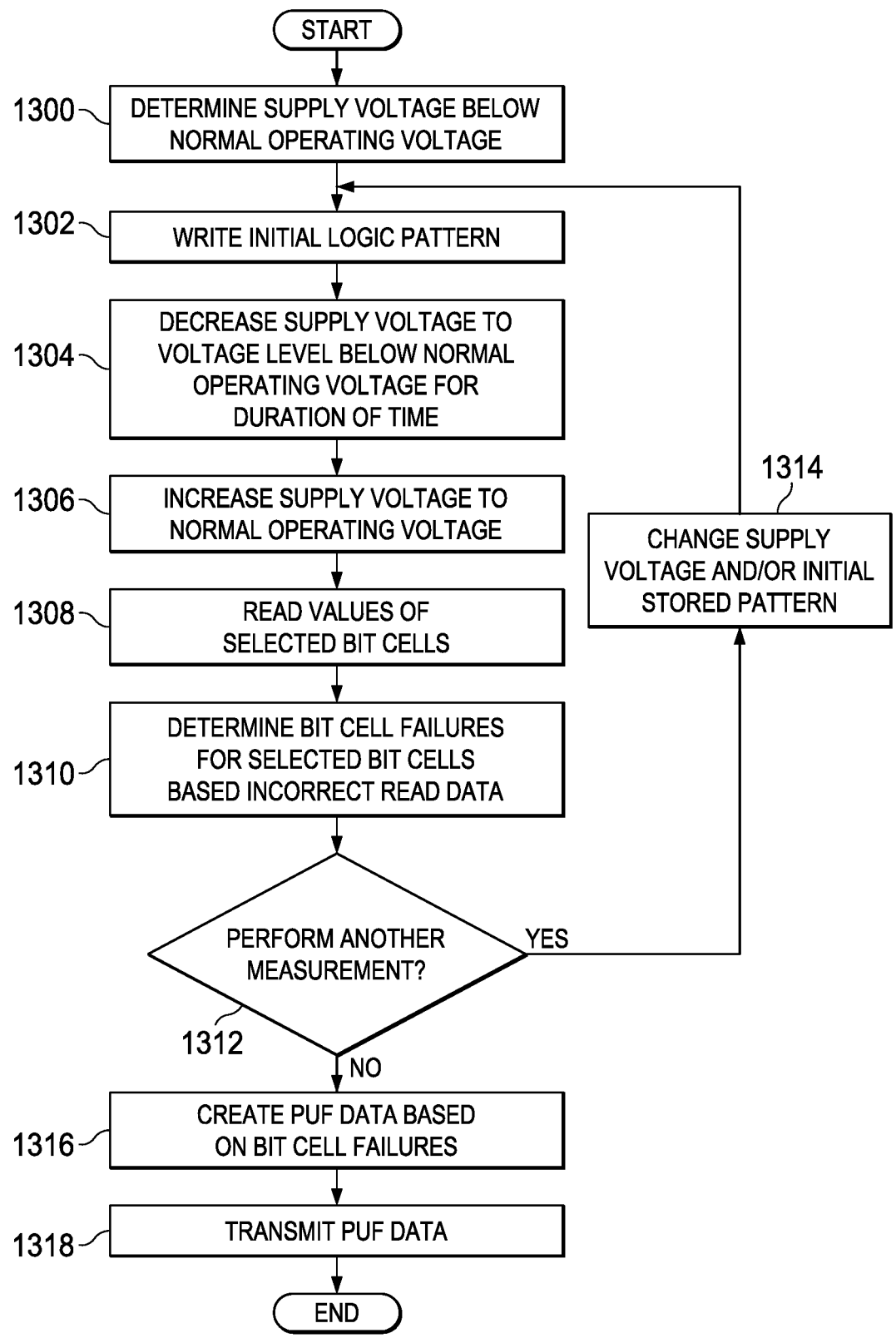
FIG. 13 is a flowchart representative of example machine readable instructions that may be executed to implement the example memory controller 202 of FIG. 7 to create a PUF using the supply voltage sequence of FIG. 14.

The example machine readable instructions illustrated in FIG. 13 may be executed to cause the memory controller 202 of FIG. 7 to create a PUF. Although the flowchart of FIG. 13 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 13 is a flowchart representative of example machine readable instructions that may be executed to implement the example memory controller 202 of FIG. 7 to create a PUF. The method of FIG. 13 begins when the example memory controller 202 receives instructions to create PUF data. The instructions could be sent from the example PUF generator 104, the example authentication host 114, and/or the example database 108. For example, instructions may be sent by the PUF generator 104 when the SRAM chip 102 is fabricated or when it has been determined that the available unique challenges in database 108 have all been applied to the SRAM array 204 and more challenge-response pairs are needed to increase the size of the PUF data in the database 108. Alternatively, the instructions may be sent by the authentication host 114 to compare a response of the SRAM chip 102 to a response stored in the example database 108 to authenticate the SRAM chip 102. In some examples, the instructions may be created internally by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 1300, the processor 700 determines a supply voltage below the normal operating voltage of the SRAM array 204. Different supply voltages may produce different bit cell read failure patterns due to physical and electrical characteristics of the bit cells, thus a PUF may be generate based, in part, on a bit cell read failure pattern at varying supply voltages operated outside the normal operating voltage.

At block 1302, the example processor 700 writes a set of values (e.g., an initial pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 1304, the example voltage source 706 decreases the supply voltage to a voltage level below the normal operating voltage. The voltage level may be any level below the normal operating voltage. After the example timer 706 has determined that the duration of time has expired, the voltage source 706 returns the supply voltage to the normal operating voltage (block 1306).

At block 1308, the example processor 700 sends instructions to the example bit cell determiner 704 to apply appropriate voltages to the word and bitlines to read the bit cells. Sense amplifiers associated with the SRAM determine the stored values of the bit cells and send the stored values to the example bit cell determiner 704. The bit cell determiner 704 determines the stored values of the bit cells and sends read data based on the stored values to the processor 700. At block 1310, the example processor 700 may determine a bit cell read failure pattern for the selected bit cells based on incorrect read data. Incorrect read data corresponds to receiving a stored value from the sense amplifiers that is not the same as the value written to the bit cell. The bit cell read failure pattern is a determination of which bit cells failed and/or which bit cells did not fail during a read operation.

At block 1312, the example processor 700 determines whether or not an additional measurement is needed. For example, the PUF parameters may require a PUF based on different supply voltages operated outside the normal operating voltage and/or different initial logic patterns. If the processor 700 determines that more PUF data is needed, the processor 700 will select a new supply voltage and/or a new initial logic pattern to apply to the SRAM array 204 (block 1314). If the processor 700 finished performing read measurements, the processor 700 creates PUF data based, in part, on bit cell read failures (block 1316). Alternatively, the processor 700 may apply a function to the response. For example, the processor 700 may apply a function (e.g., a logic function including and, or, XOR, not, etc.) to two or more bit cells after a challenge is applied to create additional PUF data.

At block 1318, the example transmitter 710 transmits the PUF data to the example PUF generator 104 and/or the example authentication host 114. In some examples, the PUF generator 104 stores the PUF data in the example database 108 via the example network 106. Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may be sent to the example PUF generator 104 (e.g., to store PUF data) and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 14:
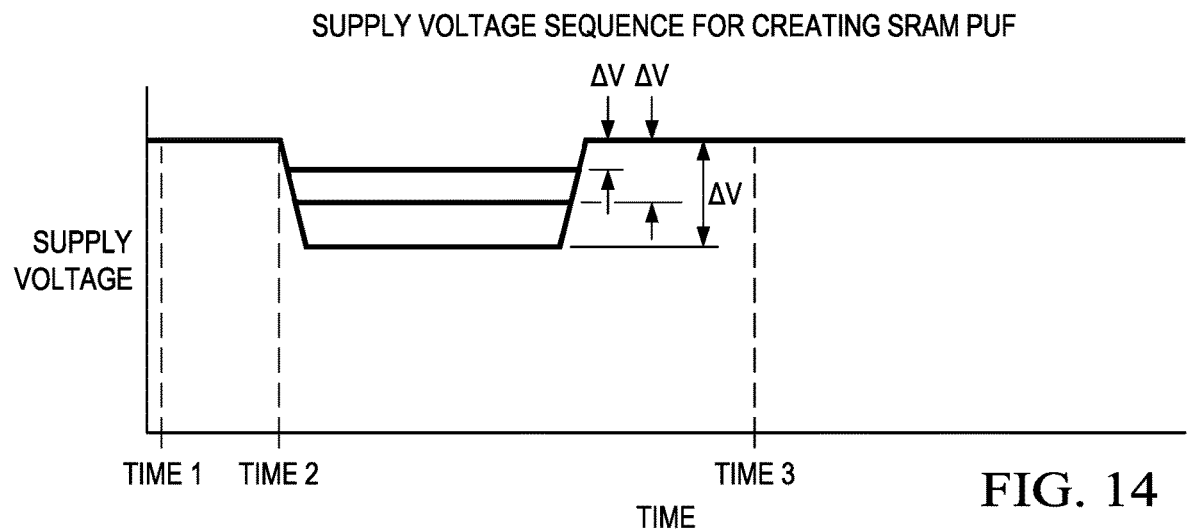
FIG. 14 is a graph illustrating another supply voltage sequence for the example SRAM chip 102 of FIG. 1 based on bit cell read failures at a variable supply voltage lower than the normal operating supply voltage of the SRAM.

FIG. 14 illustrates an example supply voltage that may be output to create PUF data based, in part, on a duration of time that the supply voltage is operated outside a normal operating voltage, as described in the flowchart of FIG. 13. At time 1, the supply voltage is at a normal operating voltage (e.g., 1.5 V). The example processor 700 of FIG. 7 sends instructions to the example bit cell determiner 704 to write the initial logic pattern for bit cells of an SRAM array 204 (e.g., which bit cells store a logic value of '0' and which bit cells store a logic value of '1'). At time 2, the example processor 700 sends instructions to the example timer 708 and the example voltage source 706 to decrease the supply voltage to a voltage (e.g., 0.7 V) below the normal operating voltage of the SRAM array 204 for a predetermined duration of time. Operating at a supply voltage outside the normal operating voltage may cause bit cells of the SRAM array 204 to fail (e.g., lose their stored logic values). In this manner, a PUF may be generated based on a read failure pattern (e.g. which bit cells failed given the initial stored logic pattern) for bit cells based on various supply voltage levels operated outside the normal operating voltage of an SRAM array 204.

At time 3 of FIG. 14, after the supply voltage has returned to the normal operating voltage, the example processor 700 sends instructions to the example bit cell determiner 704 to read logic values stored in the bit cells. The bit cell determiner 704 receives read data from stored values of the bit cells and sends the read data to the processor 700 to determine which bit cells failed. A read failure pattern of the bit cells can be determined based on which bit cells failed. Additionally, the example processor 700 may create more PUF data by changing the initial logic pattern and/or changing the duration of time that the supply voltage is operated outside the normal operating voltage of the SRAM array 204. The processor 700 repeats the process to determine a new read failure pattern based on the new initial logic pattern and/or the new supply voltage below the normal operating voltage. For example, the processor may apply a new challenge with the same parameters as the example challenge, but at a different supply voltage below the normal operative voltage (e.g., AV) to create a new read failure pattern. In this manner, the example processor 700 may correlate the two, or more, read failure patterns to create a PUF based, in part, on the different supply voltages. The example processor 700 sends PUF data (e.g., the read failure pattern(s)) to the example transmitter 710 to transmit the PUF data to a database and/or an authentication host 114. Additionally, the processor 700 may create more PUF data at a later time (e.g., when the number of challenges stored in the database 108 has been exhausted, when instructions are sent to create more PUF data, etc.).

Figure 15:
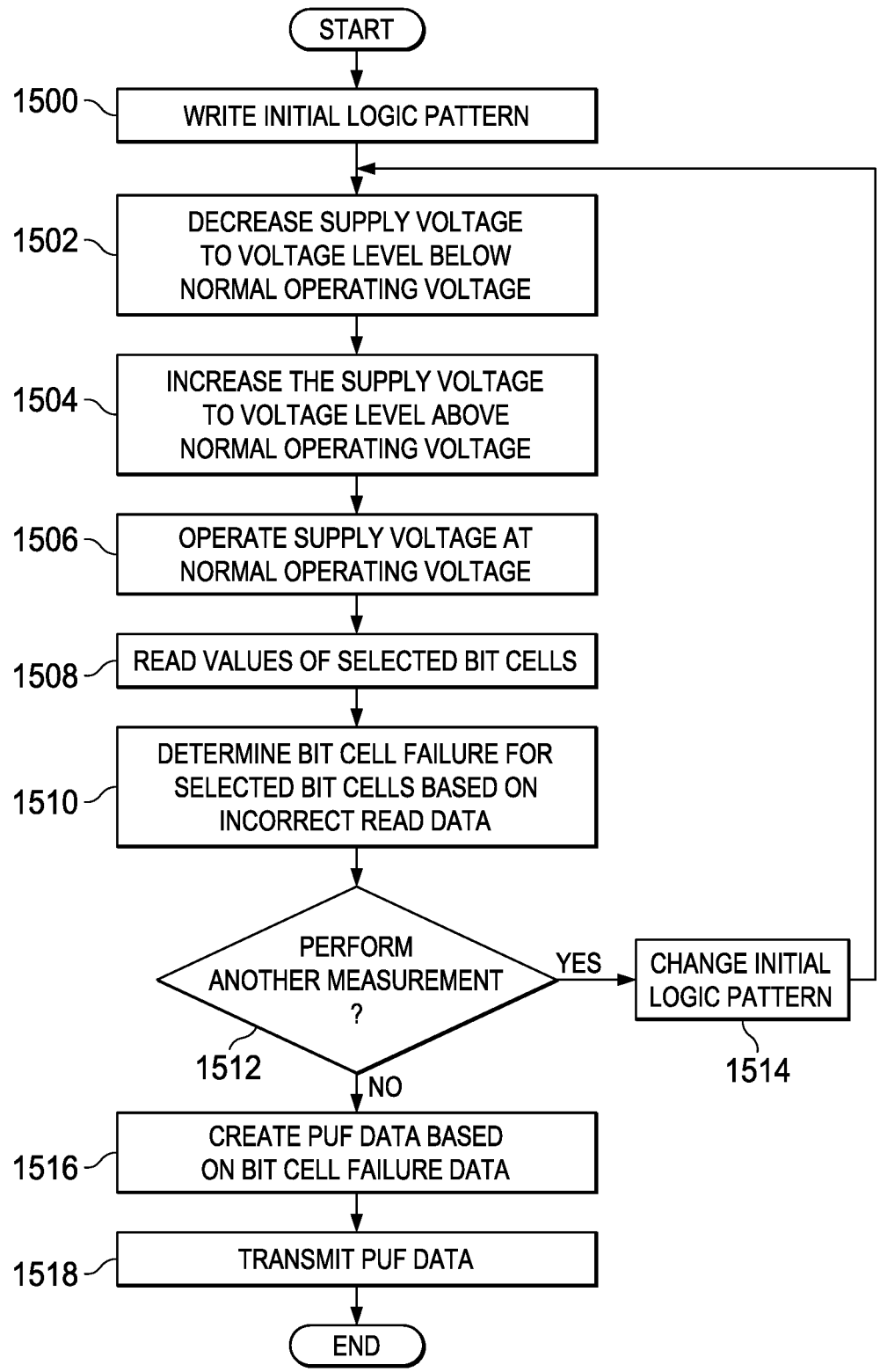
FIG. 15 is a flowchart representative of example machine readable instructions that may be executed to implement the example memory controller 202 of FIG. 7 to create a PUF using the supply voltage sequence of FIG. 16.

The example machine readable instructions illustrated in FIG. 15 may be executed to cause the memory controller 202 of FIG. 7 to create a PUF. Although the flowchart of FIG. 15 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 15 is a flowchart representative of example machine readable instructions that may be executed to implement the example memory controller 202 of FIG. 7 to create a PUF. The method of FIG. 15 begins when the example memory controller 202 of FIG. 7 receives instructions to create PUF data. The instructions could be sent from the example PUF generator 104, the example authentication host 114, and/or the example database 108. For example, instructions may be sent by the PUF generator 104 when the SRAM chip 102 is fabricated or when it has been determined that the number of unique challenges has been applied to the SRAM array 204 and more challenge-response pairs are needed to increase the size of the PUF data in the database 108. Alternatively, the instructions may be sent by the authentication host 114 to compare a response of the SRAM chip 102 to a response stored in the example database 108 to authenticate the SRAM chip 102. In some examples, the instructions may be created internally by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 1500, the example processor 700 writes a set of values (e.g., an initial logic pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 1502, the example voltage source 706 decreases the supply voltage to a voltage level below the normal operating voltage. The voltage level may be any level below the normal operating voltage. After the example timer 706 has determined that the duration of time has expired, the voltage source 706 increases the supply voltage to a voltage higher than normal operating voltage for a preset duration of time (block 1504). After the example timer 706 has determined that the preset duration of time has expired, the voltage source 706 returns the supply voltage to the normal operating voltage (block 1506).

At block 1508, the example processor 700 sends instructions to the example bit cell determiner 704 to apply appropriate voltages to the word and bitlines to read the bit cells. Sense amplifiers associated with the SRAM determine the stored values of the bit cells and send the stored values to the example bit cell determiner 704. The bit cell determiner 704 determines the stored values of the bit cells and sends read data based on the stored values to the processor 700. At block 1510, the example processor 700 may determine a bit cell read failure pattern for the selected bit cells based on incorrect read data. Incorrect read data corresponds to receiving a stored value from the sense amplifiers that is not the same as the value written to the bit cell. The bit cell read failure pattern is a determination of which bit cells failed and/or which bit cells did not fail.

At block 1512, the example processor 700 determines whether or not an additional measurement is needed. For example, the PUF parameters may require a PUF based on different initial stored patterns. If the processor 700 determines that more PUF data is needed, the processor 700 will select a new initial logic pattern to apply to the SRAM array 204 (block 1514). If the processor 700 finished performing read measurements, the processor 700 creates PUF data based, in part, on bit cell read failures (block 1516). Alternatively, the processor 700 may apply a function to the response. For example, the processor 700 may apply a function (e.g., a logic function including and, or, XOR, not, etc.) to two or more bit cells after a challenge is applied to create additional PUF data.

At block 1518, the example transmitter 710 transmits the PUF data to the example PUF generator 104 and/or the example authentication host 114. In some examples, the PUF generator 104 stores the PUF data in the example database 108. Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may be sent to the example PUF generator 104 (e.g., to store PUF data), and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 16:
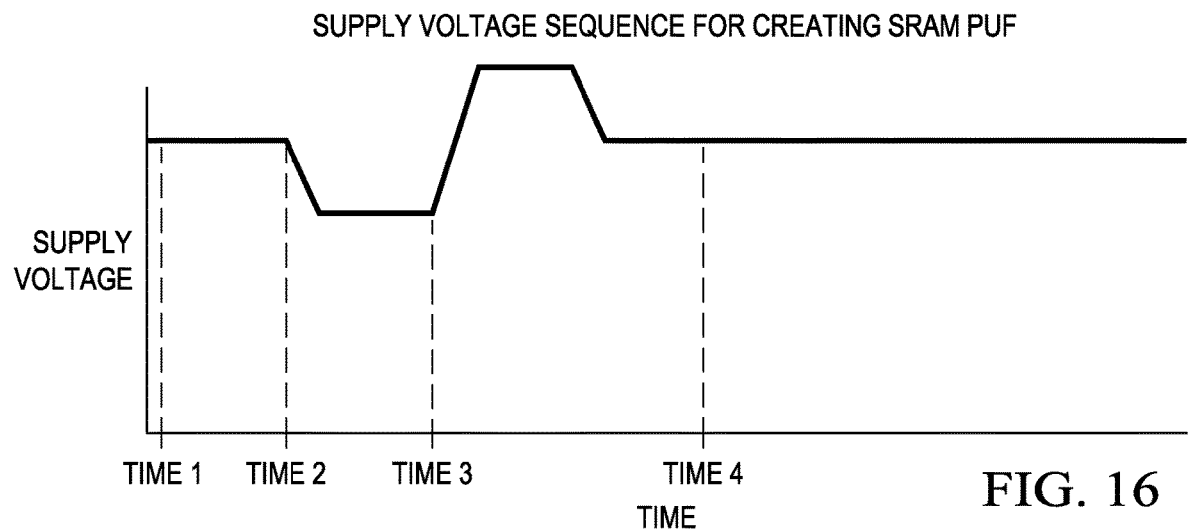
FIG. 16 is a graph illustrating another supply voltage sequence for the example SRAM chip 102 of FIG. 1 based on bit cell read failures at a supply voltage lower and then above than the normal operating supply voltage of the SRAM.

FIG. 16 illustrates an example supply voltage that may be output to create PUF data based, in part, on operating the supply voltage both above and below a normal operating voltage, as described in the flowchart of FIG. 15. At time 1, the supply voltage is at a normal operating voltage (e.g., 1.5 V). The example processor 700 of FIG. 7 sends instructions to the example bit cell determiner 704 to write the initial logic pattern for bit cells of an SRAM array 204 (e.g., which bit cells store a logic value of '0' and which bit cells store a logic value of '1'). At time 2, the processor 700 sends instructions to the example timer 708 and the example voltage source 706 to decrease the supply voltage to a voltage (e.g., 0.7 V) below the normal operating voltage of the SRAM array 204 for a predetermined duration of time. Operating at a supply voltage outside the normal operating voltage may cause bit cells of the SRAM array 204 to fail (e.g., lose their stored logic value).

At time 3 of FIG. 16, the example processor 700 instructs the example voltage source 706 to increase the supply voltage to a voltage above the normal operating voltage (e.g., 2.1V) for a duration of time measured by the example timer 708 before returning to the normal operating voltage. Alternatively or additionally, a voltage applied to bitlines and/or wordlines associated with the bit cells may be raised and/or lowered outside the normal operating voltage to determine a bit cell read failure pattern. In this manner, a PUF is created based, in part, on the read failure pattern (e.g. which bit cells failed given the initial stored logic pattern) for bit cells based on a supply voltage level operated both above and below the normal operating voltage of an SRAM array 204.

At time 4 of FIG. 16, after the supply voltage has returned to the normal operating voltage, the example bit cell determiner 704 receives read data from the SRAM array 204. Additionally, the example processor 700 may read the stored bit cells at the voltage above the normal operating voltage to create additional PUF data. The bit cell determiner 704 sends the read data to the processor 700 to determine a read failure pattern of the bit cells. Additionally, the example processor 700 may create more PUF data by changing the initial logic pattern and/or changing the supply voltage above and/or below the normal operating voltage (e.g., 0.5 V/2V) of the SRAM array 204. Additionally or alternatively, the voltage applied to the bitline and/or wordline may be changed to create additional PUF data. The processor 700 repeats the process to determine a new read failure pattern based on the new initial logic pattern and/or the new supply voltage above or below the normal operating voltage. The example processor 700 sends PUF data (e.g., the read failure pattern and/or the PUF parameters) to the example transmitter 710 to transmit the PUF data to a database and/or an authentication host 114. Additionally, the example processor 700 may create more PUF data at a later time (e.g., when the number of challenges stored in database 108 has been exhausted, when instructions are sent to create more PUF data, etc.).

Figure 17:
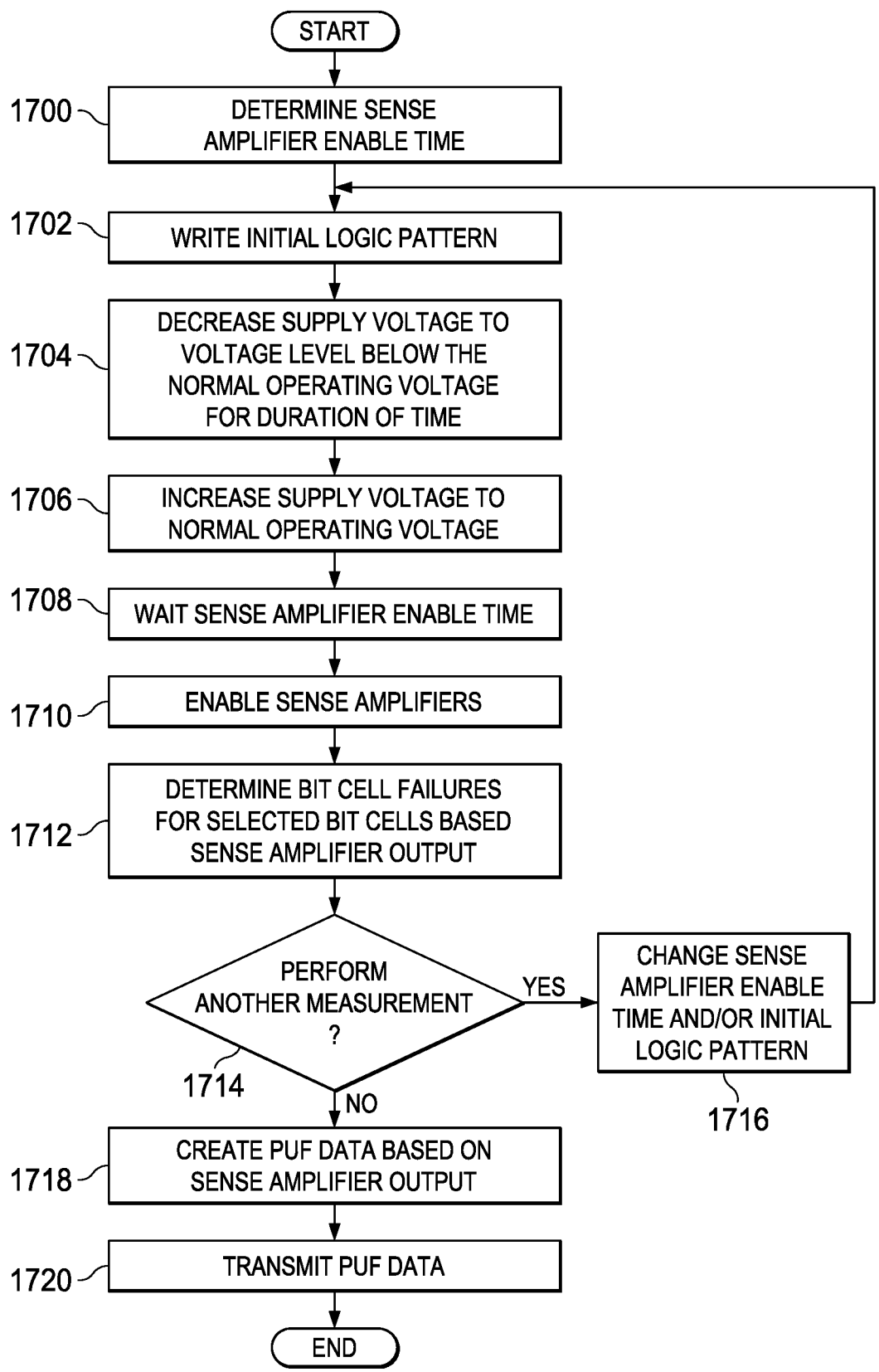
FIG. 17 is a flowchart representative of example machine readable instructions that may be executed to implement the example memory controller 202 of FIG. 7 to create a PUF using the supply voltage sequence of FIG. 18.

The example machine readable instructions illustrated in FIG. 17 may be executed to cause the memory controller 202 of FIG. 7 to create a PUF. Although the flowchart of FIG. 17 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 17 is a flowchart representative of example machine readable instructions that may be executed to implement the example memory controller 202 of FIG. 7 to create a PUF. The method of FIG. 17 begins when the example memory controller 202 of FIG. 7 receives instructions to create PUF data. The instructions could be sent from the example PUF generator 104, the example authentication host 114, and/or the example database 108. For example, instructions may be sent by the PUF generator 104 when the SRAM chip 102 is fabricated or when it has been determined that the unique challenges stored in the database 108 have been applied to the SRAM array 204 and more challenge-response pairs are needed to increase the size of the PUF data in the database 108. Alternatively, the instructions may be sent by the authentication host 114 to compare a response of the SRAM chip 102 to a response stored in the example database 108 to authenticate the SRAM chip 102. In some examples, the instructions may be created internally by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 1700, the processor 700 determines a sense amplifier enable delay. A sense amplifier enable delay that is less than the normal sense amplifier enable delay may induce a chaotic regime in the sense amplifiers. A PUF may be generated based on the output of the sense amplifiers when enabled before the normal sense amplifier enable delay.

At block 1702, the example processor 700 writes a set of values (e.g., an initial pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 1704, the example voltage source 706 decreases the supply voltage to a voltage below the normal operating voltage. The voltage may be any voltage below the normal operating voltage. After the example timer 706 has determined that the duration of time has expired, the voltage source 706 returns the supply voltage to the normal operating voltage (block 1706).

At block 1708, the example processor 700 waits until the sense amplifier enable delay has expired, as determined by the example timer 708. Alternatively, the processor 700 may wait the sense amplifier time based on a count of clock cycles of the example processor 700. At block 1710, the example processor 700 enables the sense amplifiers and sends instructions to the example bit cell determiner 704 to apply appropriate voltages to the word and bitlines to read the bit cells. Since the sense amplifier enable delay is less than the normal sense amplifier enable delay, the output of the sense amplifiers may be incorrect. At block 1712, the example processor 700 gathers the sense amplifier outputs. An incorrect sense amplifier output corresponds to receiving a stored value from the sense amplifiers that is not the same as the value written to the bit cell.

At block 1714, the example processor 700 determines whether or not an additional measurement is needed. For example, the PUF parameters may require a PUF based on different sense amplifier delay and/or different initial stored patterns. If the processor 700 determines that more PUF data is needed, the processor 700 will select a new sense amplifier enable delay and/or a new initial logic pattern to apply to the SRAM array 204 (block 1716). If the processor 700 finished performing read measurements, the processor 700 creates PUF data based, in part, on bit cell read failures (block 1718). Alternatively, the processor 700 may apply a function to the response. For example, the processor 700 may apply a function (e.g., a logic function including and, or, XOR, not, etc.) to two or more bit cells after a challenge is applied to create additional PUF data.

At block 1720, the example transmitter 710 transmits the PUF data to the example PUF generator 104 and/or the example authentication host 114. In some examples, the PUF generator 104 stores the PUF data in the example database 108. Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may sent to the example PUF generator 104 (e.g., to store PUF data), and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 18:
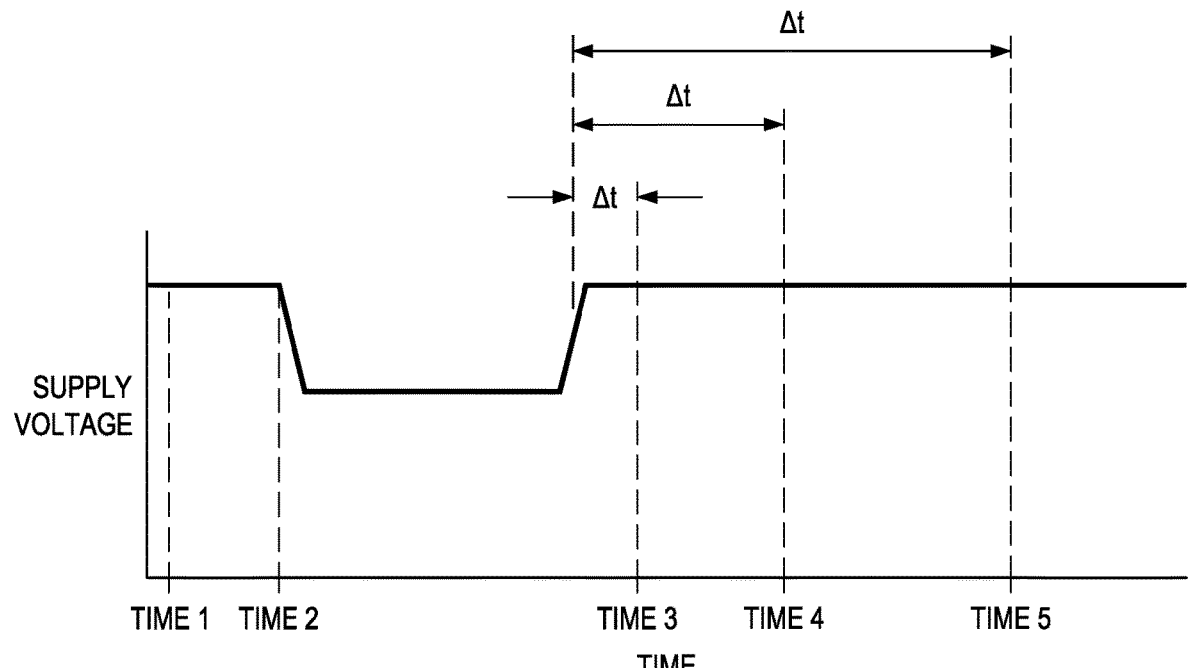
FIG. 18 is a graph illustrating another supply voltage sequence for the example SRAM chip 102 of FIG. 1 based on sense amplifier outputs when applying a sense amplifier enable delay that is less than a normal sense amplifier enable delay of the sense amplifiers.

FIG. 18 illustrates an example supply voltage that may be output to create PUF data based, in part, on 1) varying a duration of time after which the sense amplifiers are enabled and 2) the output from the sense amplifiers, as described in the flowchart of FIG. 17. At time 1, the supply voltage of the SRAM array 204 is at a normal operating voltage (e.g., 1.5 V). The example processor 700 of FIG. 7 sends instructions to the example bit cell determiner 704 to write the initial logic pattern for bit cells of an SRAM array 204 (e.g., which bit cells store a logic value of '0' and which bit cells store a logic value of '1'). At time 2, the example processor 700 sends instructions to the example timer 708 and the example voltage source 706 to decrease the supply voltage to a voltage (e.g., 0.7 V) below the normal operating voltage of the SRAM array 204 for a predetermined duration of time. Operating at a supply voltage outside the normal operating voltage may cause bit cells of the SRAM array 204 to fail (e.g., lose their stored logic value). In this manner, a PUF may be generated based, in part, on the sense amplifier output at different durations of time after read instructions have been sent to the SRAM array 204.

At time 3 of FIG. 18, after the supply voltage has returned to the normal operating voltage, the example processor 700 enables sense amplifiers associated with the bit cells to read the stored logic values in the bit cells. If the sense amplifiers are enabled faster than a normal sense amplifier enable delay, a chaotic regime in the sense amplifiers may be induced. For example, a normal sense amplifier enable delay for an SRAM array 204 may be 100 nanoseconds after the read instructions are sent to the SRAM array 204. The example timer 708 monitors time to inform the processor 700 of the normal sense amplifier enable delay in response to sending the read instructions to the SRAM array 204. If the sense amplifiers are enabled in less than 100 nanoseconds (e.g., 20 nanoseconds (time 3)) after the read instructions are applied, the output of the sense amplifiers associated with the bit cells may or may not be equal to the initial value stored in the bit cells. Alternatively, the example processor 700 may enable the sense amplifiers while the supply voltage is still being operated at a voltage outside the normal operating voltage for the SRAM array 204. In this manner, PUF data can be generated based, in part, on the output of the sense amplifiers.

Equipped with time data from the example timer 708, the processor 700 enables the sense amplifiers at a time less than the normal sense amplifier enable delay. The example bit cell determiner 704 receives data from the sense amplifier outputs and sends the sense amplifier data to the example processor 700 to determine a pattern based on the sense amplifier outputs at different sense enable delays. Additionally, the processor 700 may create more PUF data by changing the initial logic pattern and/or changing the duration of time before enabling the sense amplifiers (e.g., Time 4 and/or Time 5). The example processor 700 repeats the process to determine a new read failure pattern based on the new initial logic pattern and/or the new duration of time. The processor 700 sends PUF data (e.g., the sense amplifier output) to the example transmitter 710 to transmit the PUF data to a database and/or an authentication host 114. Additionally, the processor 700 may create more PUF data at a later time (e.g., when the number of challenges stored in the database 108 has been exhausted, when instructions are sent to create more PUF data, etc.).

Figure 19:
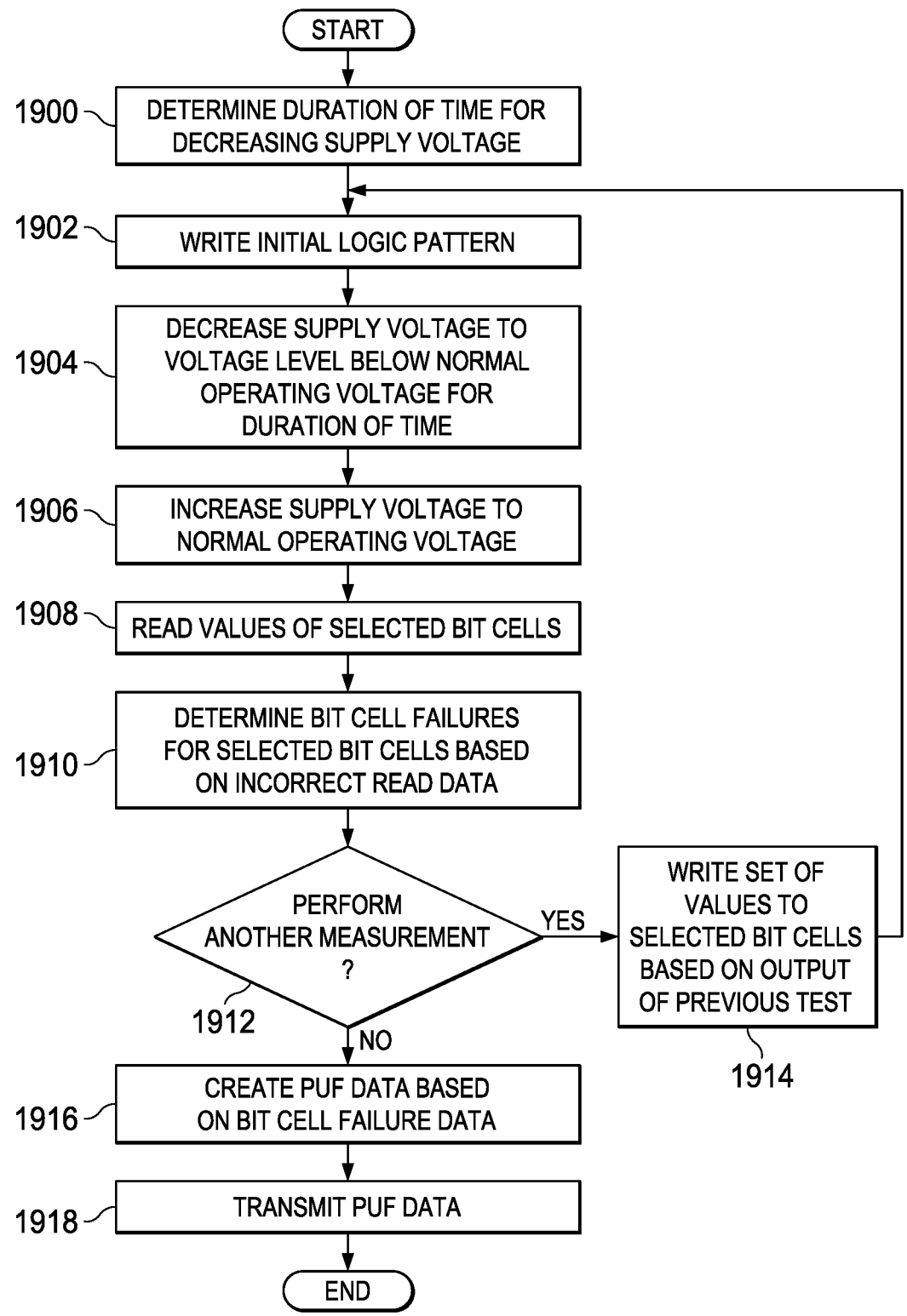
FIG. 19 is a flowchart representative of example machine readable instructions that may be executed to implement the example memory controller 202 of FIG. 7 to create a PUF using the supply voltage sequence of FIG. 20.

The example machine readable instructions illustrated in FIG. 19 may be executed to cause the memory controller 202 of FIG. 7 to create a PUF. Although the flowchart of FIG. 19 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 19 is a flowchart representative of example machine readable instructions that may be executed to implement the example memory controller 202 of FIG. 7 to create a PUF. The method of FIG. 19 begins when the example memory controller 202 receives instructions to create PUF data through multiple challenges and responses in a recursive manner. The instructions could be sent from the example PUF generator 104, the example authentication host 114, and/or the example database 108. For example, instructions may be sent by the PUF generator 104 when the SRAM chip 102 is fabricated or when it has been determined that the unique challenges stored in the database have been applied to the SRAM array 204 and more challenge-response pairs are needed to increase the size of the PUF data in the database 108. Alternatively, the instructions may be sent by the authentication host 114 to compare a response of the SRAM chip 102 to a response stored in the example database 108 to authenticate the SRAM chip 102. In some examples, the instructions may be created internally by example processor 700 of the example memory controller 202. For example, the processor 700 may track challenges applied by the example authentication host 114. In this manner, the processor 700 may create new challenge-response pairs to be stored in the database 108 to prevent the authentication host from applying a challenge that has already been applied. Alternatively, the processor 700 may communicate with the authentication host 114 through transmitter 710 to use a different challenge.

At block 1900, the processor 700 determines a duration of time for decreasing a supply voltage to a voltage outside the normal operating voltage of the SRAM array 204. Different durations of time and different supply voltages may produce different bit cell read failure patterns due to physical and electrical characteristics of the bit cells, thus a PUF may be generate based, in part, on a bit cell read failure pattern at varying supply voltage outside the normal operating range and varying durations of time that the supply voltage is operated outside the normal operating voltage.

At block 1902, the example processor 700 writes a set of values (e.g., an initial pattern) to selected bit cells based on PUF parameters from the instructions sent to the example memory controller 202. Once the initial logic pattern has been written to the bit cells, the processor 700 instructs the example voltage source 706 to control a supply voltage associated with the SRAM array 204. At block 1904, the example voltage source 706 decreases the supply voltage to a voltage below the normal operating voltage. The voltage may be any voltage below the normal operating voltage. After the example timer 706 has determined that the duration of time has expired, the voltage source 706 returns the supply voltage to the normal operating voltage (block 1906).

At block 1908, the example processor 700 sends instructions to the example bit cell determiner 704 to apply appropriate voltages to the word and bitlines to read the bit cells. Sense amplifiers associated with the SRAM determine the stored values of the bit cells and send the stored values to the example bit cell determiner 704. The bit cell determiner 704 determines the stored values of the bit cells and sends read data based on the stored values to the processor 700. At block 1910, the example processor 700 may determine a bit cell read failure pattern for the selected bit cells based on incorrect read data. Incorrect read data corresponds to receiving a stored value from the sense amplifiers that is not the same as the value written to the bit cell. The bit cell read failure pattern is a determination of which bit cells failed and/or which bit cells did not fail.

At block 1912, the example processor 700 determines whether or not an additional measurement is needed. For example, the PUF parameters may require a PUF based on different durations of time that the supply voltage is operated at a voltage outside the normal operating voltage and/or different initial stored patterns. If the processor 700 determines that more PUF data is needed, the processor 700 will use the data from the response (e.g., bit cell read failure pattern) to generate a new set of PUF parameters for a new challenge (block 1914). The response of the initial challenge may be used to determine a new initial stored pattern, a duration of time to apply the supply voltage outside the normal operating voltage, the sense amplifier enable delay, the supply voltage level, the word and/or bitline voltages, what supply voltage output to apply, and/or any possible combination of PUF parameters. The new challenge is then applied to create a new response. This recursive challenge can have as many different challenges, each based on the response to the last challenge as determined by the example processor 700 and/or the PUF parameters sent to the processor 700. If the processor 700 finished performing read measurements, the processor 700 creates PUF data based, in part, on bit cell read failures (block 1916). Alternatively, the processor 700 may apply a function to the response. For example, the processor 700 may apply a function (e.g., a logic function including and, or, XOR, not, etc.) to two or more bit cells after a challenge is applied to create additional PUF data.

At block 1918, the example transmitter 710 transmits the PUF data to the example PUF generator 104 and/or the example authentication host 114. In some examples, the PUF generator 104 stores the PUF data in the example database 108 via the example network 106 (e.g., to be stored for later authentication). Alternatively, the transmitter 710 may send all, or part, of the data associated with the challenge(s) and/or the response(s) directly to the example database 108 via the example network 106 (e.g., to be stored for later authentication). In this manner, the database 108 may aggregate the responses to create the PUF data. In some examples, the authentication host 114 receives the PUF data to authenticate the SRAM chip 102. Alternatively, the example processor 700 may use the PUF data to create a key. The key may be sent to the example PUF generator 104 (e.g., to store PUF data) and/or the example database 108 (e.g., to store PUF data). Additionally, a cryptographic hash function may be applied to the key creating a HMAC. The HMAC may be sent to the example authentication host 114 (e.g., to authenticate the SRAM chip 102).

Figure 20:
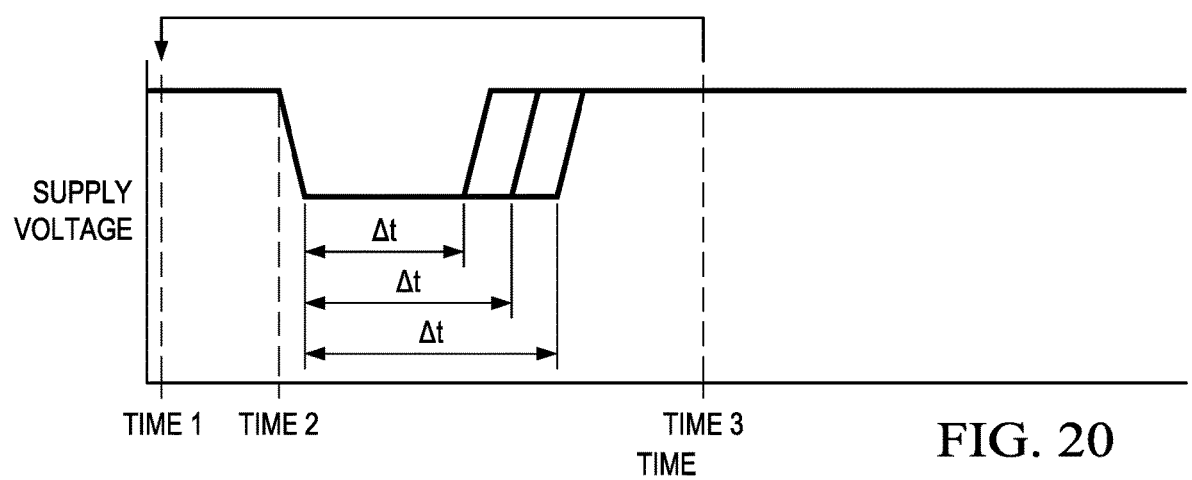
FIG. 20 is a graph illustrating another supply voltage sequence for the example SRAM array 100 of FIG. 1 based on a recursive sequence by applying the supply voltage sequences of FIGS. 8, 10, 12, 14, 16, and 18.

FIG. 20 illustrates an example supply voltage that may be output to create PUF data based, in part, on a recursive manner of applying challenges, as described in the flowchart of FIG. 19. At time 1, the operating voltage is at a normal supply voltage (e.g., 1.5 V). The example processor 700 of FIG. 7 sends instructions to the example bit cell determiner 704 to write the initial logic pattern for bit cells of an SRAM array 204 (e.g., which bit cells store a logic value of '0' and which bit cells store a logic value of '1'). At time 2, the processor 700 sends instructions to the example timer 708 and the example voltage source 706 to decrease the supply voltage to a voltage (e.g., 0.7 V) below the normal operating voltage of the SRAM array 204 for a predetermined duration of time. The example timer 708 tracks the amount of time the voltage source 706 operates at the decreased supply voltage. The example timer 708 also determines when the duration of time set by the processor 700 has expired. Once the duration of time has expired, the example processor 700 sends instructions to the voltage source 706 to operate the supply voltage at the normal operating voltage. Operating at a supply voltage outside the normal operating voltage may cause bit cells to fail of the SRAM array 204 (e.g., lose their stored logic value). In this manner, a PUF may be generated based, in part, on a read failure pattern (e.g. which bit cells failed given the initial stored logic pattern) for bit cells based on a plurality of challenges, in which the response of one challenge determines the parameters for a new challenge.

At time 3 of FIG. 20, after the supply voltage has returned to the normal operating voltage, the example processor 700 sends instructions to the example bit cell determiner 704 to read logic values stored in the bit cells. The bit cell determiner 704 receives read data from stored values of the bit cells and sends the read data to the processor 700 to determine which bit cells failed. A read failure pattern may be determined based on which bit cells failed. The read failure is used to determine new parameters for a second challenge. For example, if a response to a challenge creates a read failure pattern, the read failure pattern may be used as the initial logic pattern to the next challenge, to program the supply voltage for the next challenge, to determine a duration of time to apply the supply voltage outside a normal operating voltage of the SRAM array 204, to set a number of iterations to be performed, and/or any other variant of the methods as described in conjunction with the graphs of FIGS. 8-12. The process may be repeated any number of times to create a recursive PUF for the SRAM array 204. Additionally, the example processor 700 may create more PUF data by changing the initial logic pattern and/or changing the parameters of the challenge. The processor 700 repeats the process to determine a new read failure pattern based on the new initial logic pattern and/or the parameters of the challenge. The example processor 700 sends PUF data to the example transmitter 710 to transmit the PUF data to a database and/or an authentication host 114. Additionally, the example processor 700 may create more PUF data at a later time (e.g., when the number of challenges stored in database 108 has been exhausted, when instructions are sent to create more PUF data, etc.). Although the initial challenge was based on the supply voltage sequence from FIG. 9, any of the supply voltage sequences from FIGS. 8-20 may be used as an initial challenge.

While the example manners describe a particular supply voltage sequence, as illustrated in FIGS. 10, 12, 14, 16, 18, and 20, any of the illustrated sequences of FIGS. 10, 12, 14, 16, 18, and 20 may be combined, divided, re-arranged, omitted, eliminated, and/or implemented in any other way to create a unique PUF. For example, a PUF may be generated by combining the duration of time the supply voltage is operated outside the normal operating voltage (e.g., the supply voltage sequence of FIG. 9) while varying the supply voltage level (e.g., the supply voltage sequence of FIG. 10). Additionally, multiple sequences can be done in series and/or parallel using any of the example sequences of FIGS. 10, 12, 14, 16, 18, and 20 to create a PUF.

Figure 21:
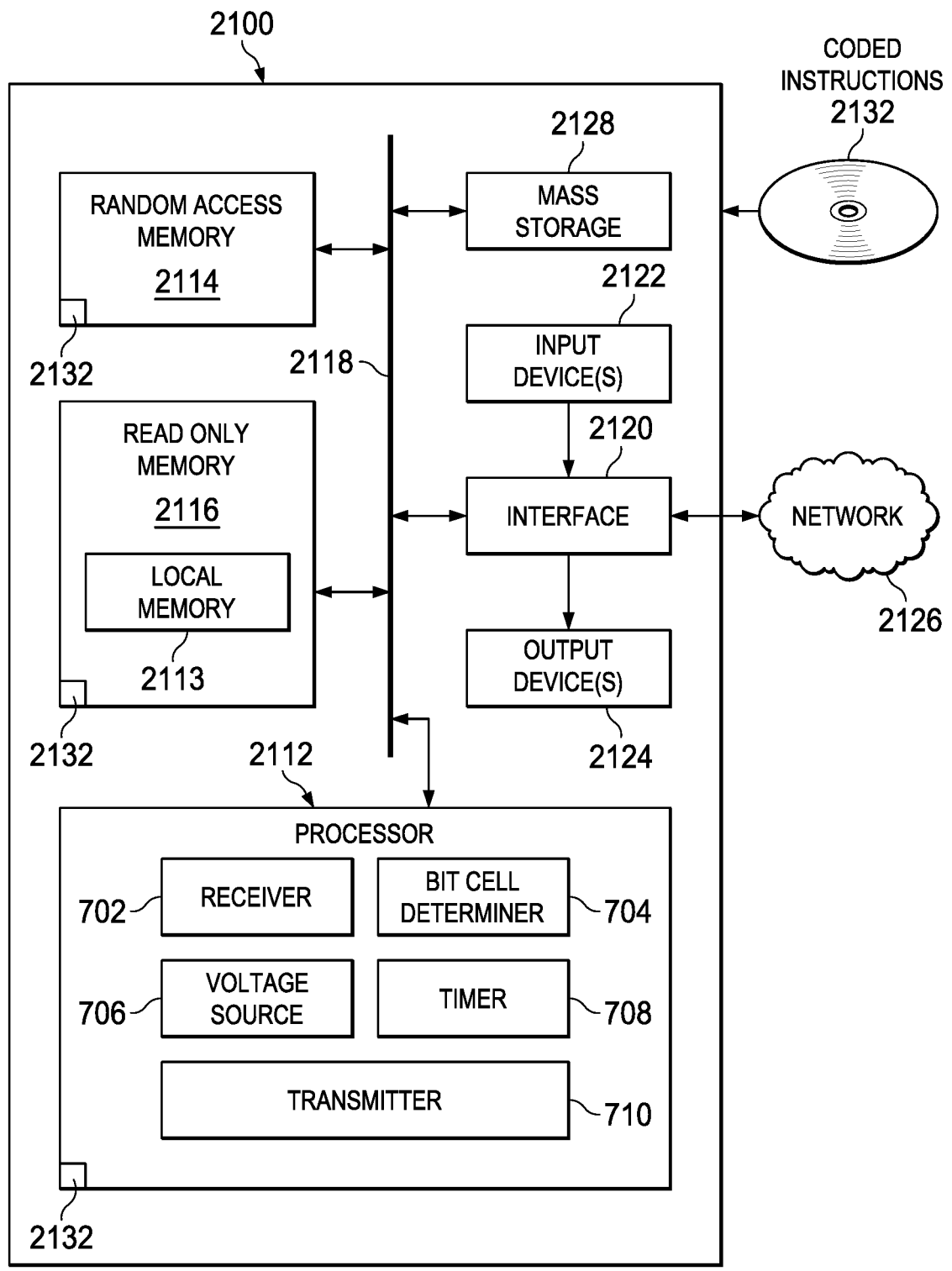
FIG. 21 is a block diagram of a processor platform structured to execute the example machine readable instructions of FIGS. 8, 9, 11, 13, 15, 17, and 19 to create a PUF.

FIG. 21 is a block diagram of an example processor platform 2100 capable of executing the instructions of FIGS. 10, 12, 14, 16, 18, and 20 to implement the example memory controller 202 of FIG. 2. The processor platform 2100 can be, for example, a server, a personal computer, a mobile device (e.g., a cell phone, a smart phone, a tablet such as an iPad™), a personal digital assistant (PDA), an Internet appliance, or any other type of computing device.

The processor platform 2100 of the illustrated example includes a processor 2112. The processor 2112 of the illustrated example is hardware. For example, the processor 2112 can be implemented by integrated circuits, logic circuits, microprocessors or controllers from any desired family or manufacturer.

The processor 2112 of the illustrated example includes a local memory 2113 (e.g., a cache). The example processor 2112 of FIG. 21 executes the instructions of FIGS. 14-20 to implement the example receiver 702, the example bit cell determiner 704, the example voltage source 706, the example timer 708, and the example transmitter 710 of FIG. 2 to implement the example memory controller 202. The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input device(s) 2122 permit(s) a user to enter data and commands into the processor 2112. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 10, 12, 14, 16, 18, and 20 may be stored in the mass storage device 2128, in the volatile memory 2114, in the non-volatile memory 2116, and/or on a removable tangible computer readable storage medium such as a CD or DVD.

From the foregoing, it would be appreciated that the above disclosed methods, apparatus, and articles of manufacture create a PUF from an SRAM circuit. Using the examples disclosed herein, a PUF is generated using a response to challenges generated at a supply voltage outside of the normal operating voltage. In some examples, bit cells are read while the supply voltage level is below the normal operating voltage level to determine a PUF based on which bit cells fail. In some examples, the supply voltage is reduced for different durations of times to determine a PUF based on which bit cells fail at which duration of time. In some examples, the supply voltage is reduced to different voltage levels outside of the normal operating voltage to determine a PUF based on which bit cells fail at which voltage level. In some examples, the supply voltage is reduced to a voltage level below the normal operating voltage and then increased to a voltage level above the normal operating voltage level to determine a PUF based on which bit cells fail. In some examples, sense amplifiers are enabled to read stored values in bit cells at a sense amplifier enable delay less than a normal sense amplifier enable delay to determine a PUF based on the output of the sense amplifiers. In some examples, the response of a previous challenge is used to determine an input for a second challenge to determine a PUF based on which bit cells fail.

The traditional SRAM PUF is a weak PUF with a small number of challenges that are easy to replicate, and therefore easier for an attacker to completely determine the challenge response pairs. Determining the challenge response pairs allows an attacker to clone an Integrated Circuit chip. A strong PUF with a larger number of complex challenge response pairs is a lot more difficult to clone since the number and quality of possible challenge response pairs are increased significantly. Also, since the SRAM arrays are already found in most Integrated Circuits, there would not be a need to add additional circuitry to the existing Integrated Circuits.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
  a memory;
  a memory controller coupled to the memory;
  a processor coupled to the memory controller;
  a non-transitory computer readable medium coupled to the processor and storing instructions that, when executed, cause the processor to:
    cause the memory controller to perform a first read/write sequence to the memory according to a first set of parameters, wherein the first read/write sequence includes:
      writing a first value to the memory;
      in response to writing the first value, reducing a supply voltage to the memory, including reducing the supply voltage from a nominal voltage; and
      in response to reducing the supply voltage to the memory, increasing the supply voltage to the nominal voltage;
      in response to reducing the supply voltage to the memory, and after the increasing of the supply voltage to the nominal voltage, reading the first value to produce a first output value; and
    cause the memory controller to perform a second read/write sequence to the memory according to a second set of parameters, wherein the second read/write sequence includes:
      writing a second value to the memory, the second value based on the first output value;
      in response to writing the second value, reducing the supply voltage to the memory; and
      in response to reducing the supply voltage to the memory, reading the second value to produce a second output value.

2. The apparatus of claim 1, wherein the first set of parameters is different from the second set of parameters in at least one of: a subset of the memory read to produce the first output value relative to a subset of the memory read to produce the second output value; the first value relative to the second value; a voltage to which the supply voltage is reduced during the first read/write sequence relative to a voltage to which the supply voltage is reduced during the second read/write sequence; a duration for which the supply voltage is reduced during the first read/write sequence relative to a duration for which the supply voltage is reduced during the second read/write sequence; or a sense amplifier enable time associated with the reading of the first value relative to a sense amplifier enable time associated with the reading of the second value.

3. The apparatus of claim 1, wherein the second read/write sequence further includes increasing the supply voltage to the memory above the nominal voltage based on the first output value prior to the reading of the second value.

4. The apparatus of claim 1, wherein the non-transitory computer readable medium stores further instructions that, when executed, cause the processor to create a security function based on the first output value and the second output value.

5. The apparatus of claim 4, wherein the non-transitory computer readable medium stores further instructions that, when executed, cause the processor to:
  provide the security function;
  receive a response to the security function; and
  determine whether to enable or disable the apparatus based on the response to the security function.

6. The apparatus of claim 1, wherein the memory controller includes a key generator configured to generate a cryptographic key based on the first output value and the second output value.

7. The apparatus of claim 1, wherein:
  the reading of the second value to produce the second output value is performed a duration of time after the reducing of the supply voltage to the memory of the second read/write sequence; and the duration of time is based on the first output value.

8. The apparatus of claim 1, wherein the non-transitory computer readable medium stores further instructions that, when executed, cause the processor to determine whether to perform a third read/write sequence based on at least one of the first output value or the second output value.

9. A method, comprising:
performing a first read/write sequence that includes:
writing a first value to a memory;
reducing a supply voltage to the memory for a first duration, including reducing the supply voltage from a nominal voltage;
in response to reducing the supply voltage to the memory, increasing the supply voltage to the nominal voltage; and
in response to reducing the supply voltage to the memory and after the increasing of the supply voltage to the nominal voltage, reading the first value to produce a first output value; and
performing a second read/write sequence that includes:
writing a second value to the memory;
reducing the supply voltage to the memory for a second duration different from the first duration and based on the first output value; and
in response to reducing the supply voltage to the memory, reading the second value to produce a second output value.

10. The method of claim 9, wherein the first output value comprises a read failure pattern, and wherein the second duration is determined by the read failure pattern.

11. The method of claim 9, wherein the first read/write sequence is different from the second read/write sequence, based on the first output value, in at least one of: a subset of the memory read to produce the first output value relative to a subset of the memory read to produce the second output value; the first value relative to the second value; a voltage to which the supply voltage is reduced during the first read/write sequence relative to a voltage to which the supply voltage is reduced during the second read/write sequence; a duration for which the supply voltage is reduced during the first read/write sequence relative to a duration for which the supply voltage is reduced during the second read/write sequence; or a sense amplifier enable time associated with reading of the first value relative to a sense amplifier enable time associated with the reading of the second value.

12. The method of claim 9, wherein the second read/write sequence further includes increasing the supply voltage to the memory above the nominal voltage based on the first output value prior to the reading of the second value.

13. The method of claim 9, further comprising creating a security function based on the first output value and the second output value.

14. The method of claim 13, further comprising:
providing the security function;
receiving a response to the security function; and
determining whether to enable or disable an apparatus that includes the memory based on the response to the security function.

15. The method of claim 9, further comprising generating a cryptographic key based on the first output value and the second output value.

16. The method of claim 9, wherein:
the reading of the second value to produce the second output value is performed a duration of time after the reducing of the supply voltage to the memory of the second read/write sequence; and
the duration of time is based on the first output value.

17. The method of claim 9, further comprising determining whether to perform a third read/write sequence based on at least one of the first output value or the second output value.

18. A method comprising:
performing a first read/write sequence, wherein the first read/write sequence is associated with at least one of a first amplifier enable delay, a first wordline voltage, or a first bitline voltage, wherein the first read/write sequence includes:
writing a first value to a memory;
reducing a supply voltage to the memory, including reducing the supply voltage from a nominal voltage;
in response to reducing the supply voltage to the memory, increasing the supply voltage to the nominal voltage; and
in response to reducing the supply voltage to the memory and after the increasing of the supply voltage to the nominal voltage, reading the first value to produce a first output value; and
performing a second read/write sequence, wherein the second read/write sequence is associated with at least one of a second amplifier enable delay, a second wordline voltage, or a second bitline voltage, each based on the first output value, wherein the second read/write sequence includes:
writing a second value to the memory;
reducing the supply voltage to the memory; and
in response to reducing the supply voltage to the memory, reading the second value to produce a second output value.

19. The method of claim 18, wherein the first output value comprises a read failure pattern, and wherein the second amplifier enable delay, the second wordline voltage, or the second bitline voltage is determined by the read failure pattern.

20. The method of claim 18, wherein the nominal voltage is 1.5 V, and wherein reducing the supply voltage in the first read/write sequence includes reducing the supply voltage to 0.7 V.

* * * * *